United States Patent
Loloi

(10) Patent No.: US 12,529,170 B2
(45) Date of Patent: Jan. 20, 2026

(54) METHOD AND APPARATUS FOR MANUFACTURING CARPETS WITH AN ANTIQUE APPEARANCE USING AN AUTOMATED CARPET LOOM

(71) Applicant: Loloi, Inc., Dallas, TX (US)

(72) Inventor: William Amir Loloi, Dallas, TX (US)

(73) Assignee: Loloi, Inc., Dallas, TX (US)

( * ) Notice: Subject to any disclaimer, the term of this patent is extended or adjusted under 35 U.S.C. 154(b) by 0 days.

(21) Appl. No.: 19/037,234

(22) Filed: Jan. 26, 2025

(65) Prior Publication Data

US 2025/0243613 A1    Jul. 31, 2025

Related U.S. Application Data

(60) Provisional application No. 63/625,828, filed on Jan. 26, 2024.

(51) Int. Cl.
*D03D 27/10* (2006.01)
*D01F 6/46* (2006.01)
(Continued)

(52) U.S. Cl.
CPC .............. *D03D 39/18* (2013.01); *D01F 6/46* (2013.01); *D01F 6/62* (2013.01); *D02G 1/14* (2013.01);
(Continued)

(58) Field of Classification Search
CPC .... D03D 39/18; D03D 15/233; D03D 15/283; D03D 15/30; D03D 15/47; D03D 15/49;
(Continued)

(56) References Cited

U.S. PATENT DOCUMENTS

| | | | |
|---|---|---|---|
| 5,699,837 A | 12/1997 | Desmet | |
| 6,273,148 B1 * | 8/2001 | Debaes | D03D 27/10 139/116.5 |

(Continued)

FOREIGN PATENT DOCUMENTS

| | | |
|---|---|---|
| EP | 1666651 B1 | 6/2006 |
| EP | 2524074 B1 | 11/2012 |

*Primary Examiner* — Robert H Muromoto, Jr.

(74) *Attorney, Agent, or Firm* — Schultz & Associates, P.C.

(57) ABSTRACT

A method and apparatus for manufacturing carpets with an antique appearance using an automated weaving machine. The system integrates advanced control of warp tension, specialized pile yarn, and a unique reed and lancet assembly to replicate the randomized wear patterns, variable pile heights, and textural intricacies characteristic of aged carpets. A blend of synthetic and natural fibers undergoes a proprietary crimping, spinning, and two-stage dyeing process, producing multicolored yarn with pseudo-random shrinkage properties. Warp threads are precisely positioned using weighted beams and tiered lancets, enabling the creation of areas with zero and non-zero pile heights, separated by gradual transition zones. The resulting carpets exhibit high aesthetic authenticity and structural durability. A chi-squared statistical process ensures the randomness of worn patterns, optimizing the antique effect. The invention provides a scalable and efficient solution for producing affordable carpets that closely mimic the look and feel of genuine antiques.

46 Claims, 16 Drawing Sheets

(51) Int. Cl.
*D01F 6/62* (2006.01)
*D02G 1/14* (2006.01)
*D02G 3/04* (2006.01)
*D02G 3/44* (2006.01)
*D03D 15/233* (2021.01)
*D03D 15/283* (2021.01)
*D03D 15/30* (2021.01)
*D03D 15/47* (2021.01)
*D03D 15/49* (2021.01)
*D03D 15/54* (2021.01)
*D03D 15/573* (2021.01)
*D03D 39/18* (2006.01)
*D06H 3/02* (2006.01)
*D06P 1/00* (2006.01)
*D06P 3/82* (2006.01)
*D06P 5/04* (2006.01)
*D06P 5/20* (2006.01)
*G06F 17/18* (2006.01)
*D03D 1/00* (2006.01)

(52) U.S. Cl.
CPC .............. *D02G 3/04* (2013.01); *D02G 3/445* (2013.01); *D03D 15/233* (2021.01); *D03D 15/283* (2021.01); *D03D 15/30* (2021.01); *D03D 15/47* (2021.01); *D03D 15/49* (2021.01); *D03D 15/54* (2021.01); *D03D 15/573* (2021.01); *D06H 3/02* (2013.01); *D06P 1/002* (2013.01); *D06P 1/0096* (2013.01); *D06P 3/8214* (2013.01); *D06P 5/04* (2013.01); *D06P 5/2077* (2013.01); *G06F 17/18* (2013.01); *D10B 2211/02* (2013.01); *D10B 2321/022* (2013.01); *D10B 2331/04* (2013.01); *D10B 2401/063* (2013.01); *D10B 2401/20* (2013.01); *D10B 2503/04* (2013.01)

(58) Field of Classification Search
CPC .... D03D 15/54; D03D 15/573; D03D 13/008; D03D 27/06; D03D 27/10; D01F 6/46; D01F 6/62; D02G 1/14; D02G 3/04; D02G 3/445; D02G 3/045; D02G 3/346; D06H 3/02; D06P 1/002; D06P 1/0096; D06P 3/8214; D06P 5/04; D06P 5/2077; G06F 17/18; D10B 2211/02; D10B 2321/022; D10B 2331/04; D10B 2401/063; D10B 2401/20; D10B 2503/04; D03C 3/06
See application file for complete search history.

(56) References Cited

U.S. PATENT DOCUMENTS

| | | | |
|---|---|---|---|
| 8,162,008 B1 | 4/2012 | Presnell | |
| 8,385,587 B2 | 2/2013 | Debaes | |
| 8,944,115 B2 | 2/2015 | Beauduin | |
| 10,233,573 B2* | 3/2019 | Beauduin | D03D 39/16 |
| 2003/0226613 A1* | 12/2003 | Debaes | D03D 39/10 |
| | | | 139/408 |
| 2005/0109416 A1* | 5/2005 | Debaes | D03D 39/16 |
| | | | 139/37 |
| 2005/0183787 A1* | 8/2005 | Debaes | D03D 39/16 |
| | | | 139/11 |
| 2006/0162801 A1* | 7/2006 | Debaes | D03D 39/16 |
| | | | 139/55.1 |
| 2007/0237921 A1* | 10/2007 | Knapp | D03D 27/00 |
| | | | 428/17 |
| 2008/0115852 A1* | 5/2008 | Debaes | D03D 39/16 |
| | | | 139/21 |
| 2013/0019987 A1* | 1/2013 | Beauduin | D03D 39/16 |
| | | | 139/21 |
| 2017/0342609 A1 | 11/2017 | Mandawewala | |
| 2020/0141033 A1 | 5/2020 | Schollier | |

* cited by examiner

METHOD AND APPARATUS FOR MANUFACTURING CARPETS WITH AN ANTIQUE APPEARANCE USING AN AUTOMATED CARPET LOOM

CROSS-REFERENCE TO RELATED APPLICATIONS

This application claims priority benefit from U.S. Provisional Application No. 63/625,828 filed on Jan. 26, 2024. The patent application identified above is incorporated here by reference in its entirety to provide continuity of disclosure.

FIELD OF THE INVENTION

The present invention relates generally to the field of carpet manufacturing. More specifically, the invention pertains to a method and apparatus for producing carpets with an antique appearance using an automated carpet weaving machine.

BACKGROUND OF THE INVENTION

Antique carpets have long been admired for their intricate designs, unique wear patterns, and rich history. These carpets often carry a high value, not only for their aesthetic appeal but also for the craftsmanship and cultural heritage they represent. Traditionally, antique carpets are handwoven over months or even years, resulting in unique variations in texture and pile height. Also, wear and natural aging produce subtle variations in texture and pile height. This painstaking process and the rarity of authentic antique carpets have made them prohibitively expensive and limited in availability. Thus, a significant market demand exists for modern carpets that replicate the antique look while remaining accessible and affordable.

Attempts have been made to mimic some of these aesthetic features using contemporary manufacturing techniques, but none of them successfully capture the look and feel of antique carpets.

For example, U.S. Pat. No. 8,944,115 to Beauduin discloses a method for producing fabrics with variable pile heights in the same row, which is useful for creating varied textures.

Similarly, U.S. Pat. No. 8,385,587 to Debaes offers a method for improving fabric consistency by addressing mixed contours in pile fabrics. These technologies mark notable advancements but fail to achieve the specific aesthetic of antique carpets due to their focus on texture uniformity or minor pile height variations.

Despite these advancements, reproducing the authentic randomized wear patterns, intricate textures, and subtle color variations found in antique carpets remains a significant challenge. Current automated manufacturing processes are specifically designed for precision and uniformity, which inherently limits their ability to replicate the imperfections and variations characteristic of antique carpets. Furthermore, conventional pile yarn compositions and dyeing techniques lack the complexity needed to simulate the visual depth and irregularities of aged fibers.

To bridge this gap, the present invention introduces a novel method and apparatus for manufacturing carpets with an antique appearance using an automated weaving machine. This invention employs a unique combination of varying pile yarn characteristics, a specially designed set of lancets, and controlled warp tension to create a carpet that closely resembles the randomized wear patterns and texture of antique carpets. In addition, a specialized dyeing process produces multicolored effects across the yarn, enhancing the visual authenticity of the final product. By blending synthetic fibers and natural wool, the yarn achieves the desired texture and resilience, while its unique shrinkage characteristics upon cutting contribute to the randomized pile height variations.

The warp tension is controlled using precisely weighted warp beams and specially shaped lancets, which manipulate the vertical positioning of the warp threads. This innovative approach allows for the creation of variable pile heights, including areas of zero pile height, where the warp and weft are exposed, adding to the worn and aged appearance. The lancets themselves feature a special tiered structure with narrow tips that facilitate controlled variability in pile height, which is essential for simulating natural wear patterns. The advanced two-stage dyeing process introduces subtle color variations within each yarn, replicating the aged and weathered appearance of antique fibers. This process enhances the overall aesthetic depth and authenticity of the carpets.

By integrating these elements, the invention delivers a modern manufacturing solution that meets the market demand for affordable, aesthetically appealing carpets with the look and feel of genuine antiques. It combines the efficiency of automated production with the artistic nuances traditionally achieved only through hand-weaving and natural aging processes, thereby offering a great improvement in carpet manufacturing technology. The result is a product that bridges the gap between traditional craftsmanship and contemporary production methods, ensuring that the beauty of antique carpets can be enjoyed by a wider audience without compromising on quality or authenticity.

SUMMARY OF THE INVENTION

The system disclosed offers an efficient repeatable manufacturing solution to meet the growing demand for carpets that replicate the charm and aesthetics of antique rugs while leveraging modern manufacturing technologies. By meticulously combining innovative techniques and materials, this system disclosed achieves a product that captures the randomized wear patterns, texture, and visual depth associated with aged, handwoven carpets. Through the use of an automated weaving system, it delivers a level of precision and repeatability that ensures consistency and efficiency without compromising on the aesthetic authenticity of the final product.

The system disclosed employs a unique combination of specialized processes and components to achieve its results. Central to its success is the innovative pile yarn composition, which blends synthetic fibers and natural wool. This mixture provides both resilience and the distinct textural qualities necessary for the antique carpet appearance. The yarn undergoes a proprietary spinning and dyeing process, resulting in a wool and plastic composition that exhibits pseudo-random shrinkage after cutting. This shrinkage contributes significantly to the variability in pile height, a hallmark of antique carpets. Moreover, the dyeing method introduces subtle multicolored effects within the yarn, enhancing its visual complexity and simulating the aged look of naturally worn fibers.

Another critical aspect of the system disclosed lies in the precise control of warp tension. This is achieved through the use of specially weighted warp beams and custom-designed lancets. These lancets feature a "draw-down" profile that interacts with the cutting tables and cutting blade to introduce controlled variations in vertical positioning of the warp threads. This interplay between the warp threads and lancets facilitates the creation of randomized pile heights, including areas of zero pile height, where the warp and weft threads are exposed. Such characteristics are essential for recreating the worn and distressed look of antique carpets.

The weaving machine used in this system disclosed is tailored to implement these innovations effectively. It employs an advanced automated system capable of producing two carpets simultaneously. This system incorporates a sophisticated reed and heddle mechanism to maintain precise alignment and tension in the warp threads. Furthermore, the cutting process involves a knife that separates the upper and lower carpets with precision, ensuring the desired pile height variations are consistently achieved.

A significant advantage of the system disclosed is its ability to generate transition zones between areas of different pile heights. These transition zones, which exhibit a gradual change from zero pile height to a full pile of approximately 3 mm, are crucial for the visual appeal and authenticity of the carpets. The random distribution and irregular shapes of these zones further enhance the illusion of natural wear and aging, making the carpets indistinguishable from genuine antiques.

In addition to its innovative manufacturing process, the system disclosed addresses practical considerations such as affordability, durability, and ease of production. By utilizing modern automated systems, it significantly reduces production time and costs compared to traditional handweaving methods. The resulting carpets are not only visually striking but also robust and suitable for everyday use, making them highly desirable in both residential and commercial markets.

The system disclosed thus represents a significant advancement in the field of carpet manufacturing. It bridges the gap between traditional craftsmanship and modern technology, offering a product that satisfies the aesthetic preferences of consumers while maintaining the efficiency and scalability required for contemporary production. By seamlessly integrating artistry and innovation, this system disclosed sets a new standard for the production of antique-style carpets, ensuring their timeless beauty can be enjoyed by a broader audience.

BRIEF DESCRIPTION OF THE DRAWINGS

In the detailed description of the preferred embodiments presented below, reference is made to the accompanying drawings.

DETAILED DESCRIPTION OF THE INVENTION

In the description that follows, like parts are marked throughout the specification and figures for the same numerals. The figures are not necessarily drawn to scale and may be shown in exaggerated or generalized form in the interest of clarity and conciseness. Unless otherwise noted, all tolerances and uses of the term "about" indicate ±10%.

In this disclosure, the terms "vertical" and "longitudinal" refer to the direction of the warp threads which is also generally parallel to the direction of carpet manufacture. The terms "horizontal", "lateral" and "latitudinal" refer to the direction of the weft threads, which is generally perpendicular to the warp threads and generally perpendicular to the direction of carpet manufacture.

Figure 1A:
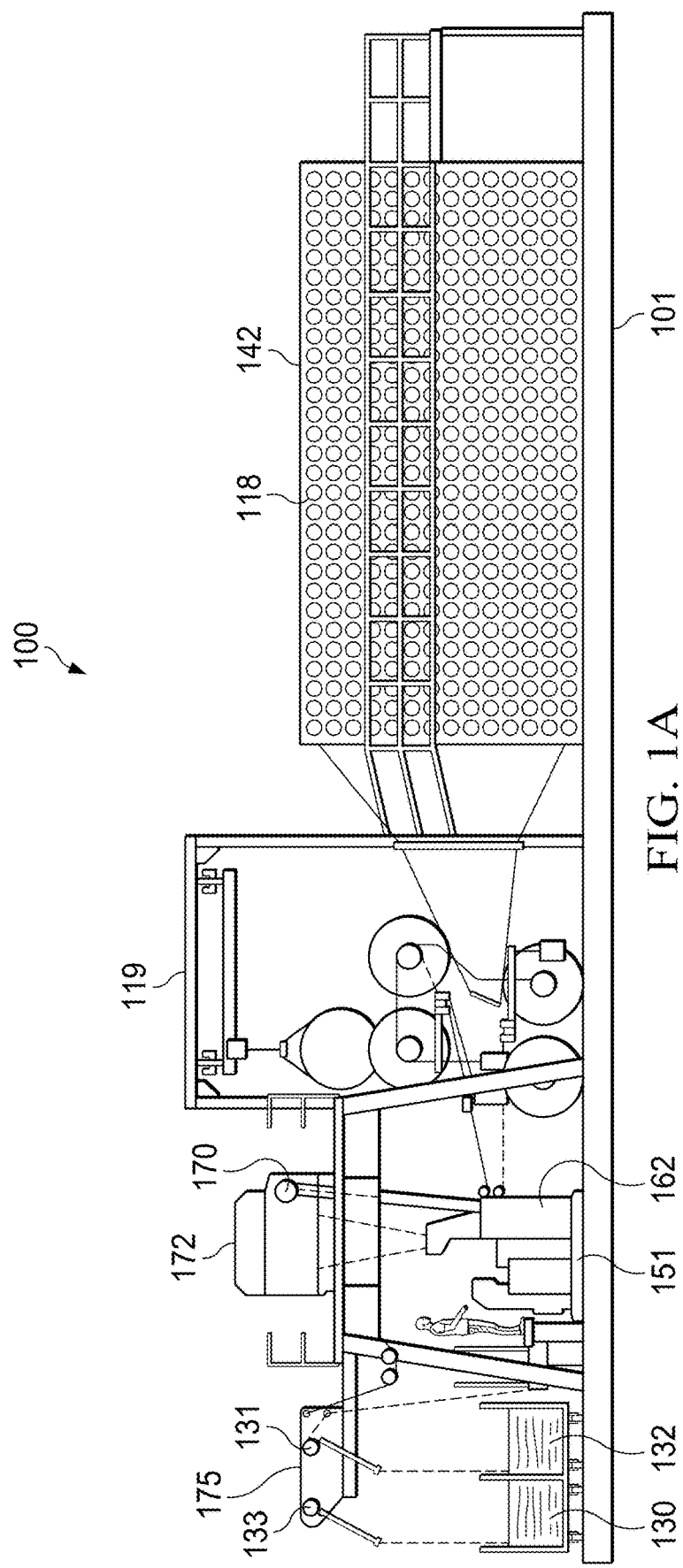
FIG. 1A is a schematic view of an automated weaving machine of a preferred embodiment.
Figure 1B:
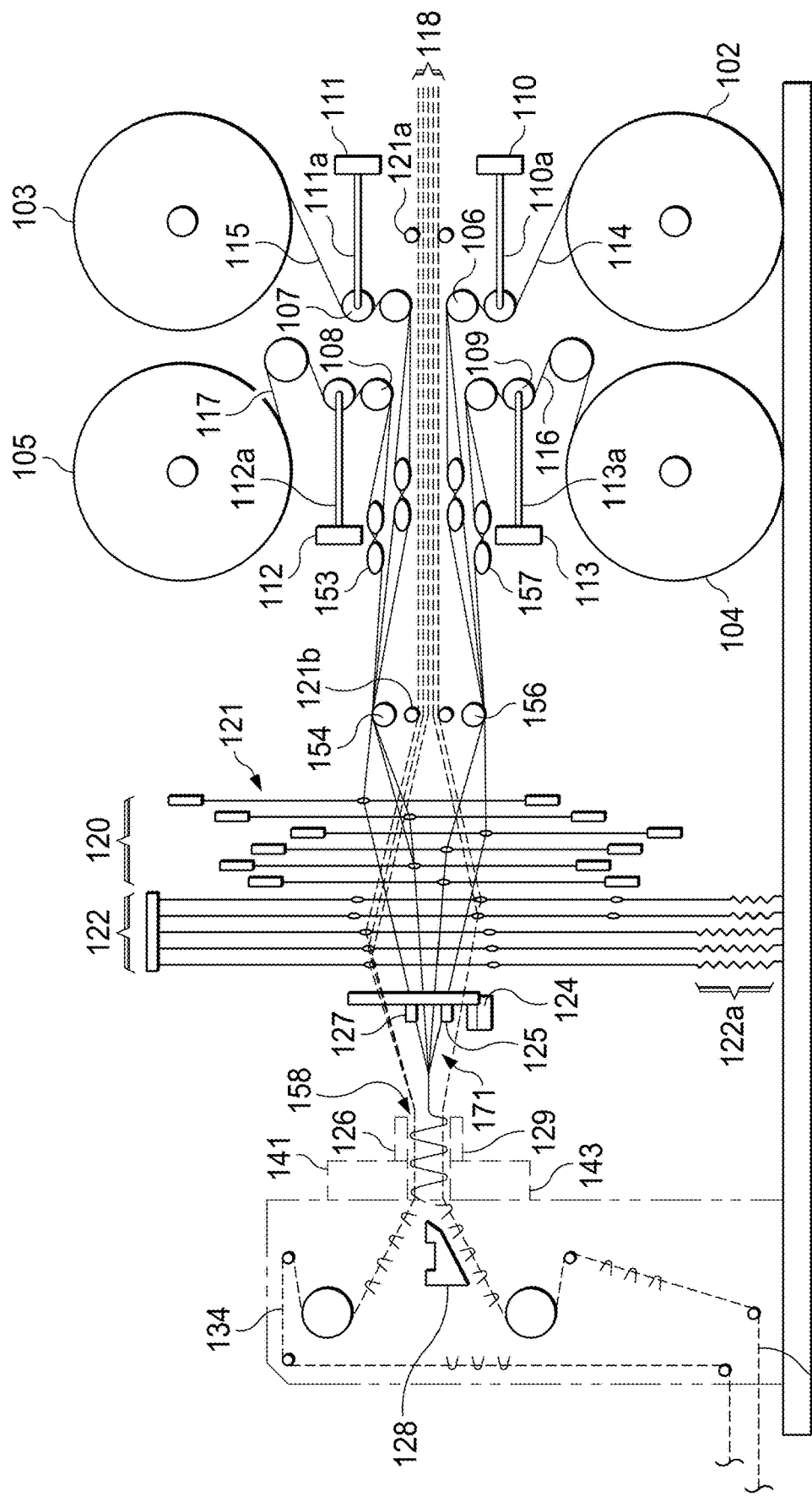
FIG. 1B is a schematic view of a double beam stand and weaving machine of a preferred embodiment.
Figure 2:
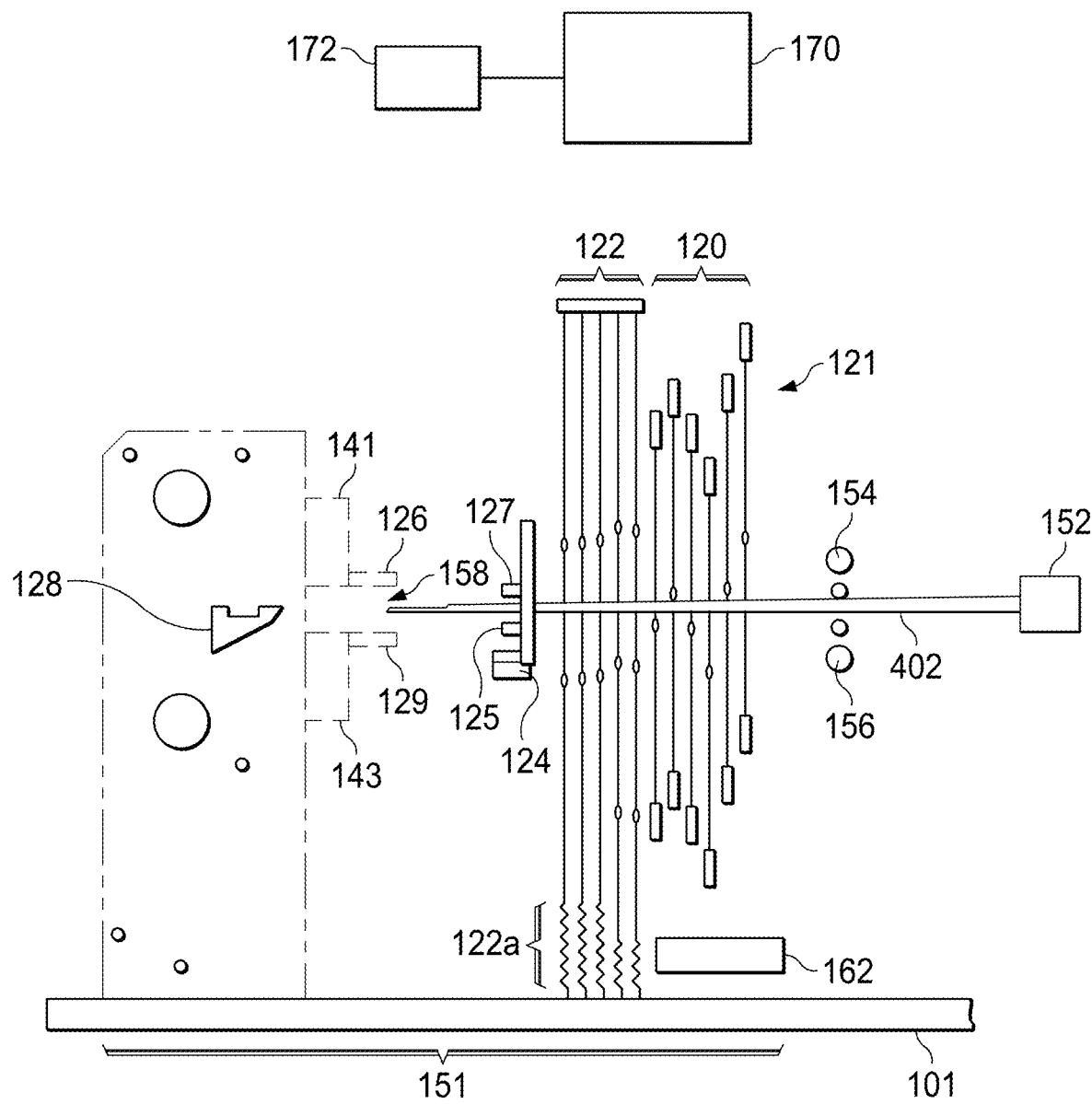
FIG. 2 is a partial schematic view of an automated weaving machine of a preferred embodiment.

Referring then to FIGS. 1A, 1B and 2, automated 2-carpet weaving system 100 will be further described. Automated weaving machine 151 is capable of 2-carpet manufacture having a beam width of about 4 meters. In a preferred embodiment, the automated weaving machine is Model No. CRM 72-400 available from Vandewiele NV of Kortrijk Belgium.

Table 1 summarizes the characteristics of a preferred automated weaving machine which may be used to implement the invention. Other automated weaving machines may be used to practice the invention.

TABLE 1

| Vandewiele CRM 72-400 |
| --- |
| Year: 1999 |
| Fabric Width: 400 Cm |
| Rapier Guiding: Roller Guiding |
| Receiving Rapier Opening: Positive Opening |
| Pile Weave Structure: 1/1 V |
| Take Up |
| Folding System to Take Up Carpets |
| Knife Stones |
| Number of Stones: 2 Round Stones & 2 Flat Stones |
| Warp Beam Stand |
| Type of Beam Stand: High Beam Stand For 8 Beams |
| Maximum Beam Diameter: 1250 mm |
| Beam Let-Off System: Motor Driven |
| Adjustment Tension: With Weights |
| Reed |
| Number of Reeds: 1 |
| Carpet Density: 320 d/m |
| Carpet Width: 4000 mm |
| Pitch In Pile Part: 1280/4000 |
| Width of Selvedge: 2 × 50 mm |
| Prewinder |
| Number of Prewinders: 2 Prewinders |
| Number of Bobbin Stand: 1 with 2 Platform of 4 Bobbins Each |

TABLE 1-continued

Vandewiele CRM 72-400

Electronic Jacquard Machine

Number of Heads: 2 PTX Electronic Head
Number of Solenoids Used: 12800
Controller: 1 Electronic Controller
Drive for Jacquard: Cardan Double Sided
Harness Number of Colors: 10 Colors
Number of Harness Cords: 12800
Return: Standard Springs
Heald Eyelet: 1080 R
Ground Warp Frames Drive of Frames: From Bottom
Heald Length: 740 mm 380 R
Number of Frames: 6 Frames
Ground Weave Structure: 1/1 + 2/2 V
Stop Motion Number of Pile Stop Motion: 1 with 12800 Drop Wires
Number of Warp Stop Motion: 1 for Top & 1 for Bottom Automated 2-carpet weaving system 100 includes base frame 101. Base frame 101 supports slack warp beams 102 and 103 and tight warp beams 104 and 105. The warp beams are spools for ground warp threads, such as tight warp threads 116 and 117 and slack warp threads 114 and 115 which are the vertical threads that form the structure of the carpet. The weaving machine has beam stand 119 which supports replacement beams and is used when the beams must be replaced. These beams in conjunction with variable weights are also responsible for maintaining the tension of the warp threads during the weaving process. In the preferred embodiment, the tension provided by weights 110, 111, 112 and 113 coupled to the beams through tensioning arms 110a, 111a, 112a and 113a. The tensioning arms allow for precise control over the warp thread tension, which is crucial for ensuring the quality and consistency of the carpets of the invention. In one embodiment, the weights should be sufficient to provide about 2 kg to about 5 kg of tension per warp thread. In another embodiment, the weights should be sufficient to provide about 1.5 kg to about 3 kg tension per warp thread.

The ground warp threads move through alignment rollers 106, 107, 108 and 109 toward leases 153 and 157. The leases are generally cross-structures that are used to separate the warp threads and keep them in order. From the leases, the warp threads proceed through alignment rollers 154 and 156.

After passing the alignment rollers, the ground warp threads enter automated weaving machine 151. Pile threads 118 pass from pile creel 142 and through alignment rollers 121a and 121b. After passing alignment rollers 121b, the pile threads enter automated weaving machine 151.

In the automated weaving machine, the ground warp threads pass through ground heddle frames 120, toward reed 124. The ground heddle frames hold the warp heddles and control their movement. The preferred weaving machine has six heddle frames, which allow for complex weaving patterns.

Ground heddle frame 120 includes heddles 121. Heddles are thin wires or flat steel strips with an eye in the middle. They guide the warp threads through the weaving machine.

Raising and lowering ground heddle frames 120 is accomplished by mechanical dobby machine 162, as known in the art. Dobby machine 162 controls the harnesses that lift and lower the warp threads to create shed 171. Shed 171 is the opening through which the weft yarn passes.

Pile threads 118 pass through pile heddles 122, moving toward reed 124. The pile heddles are connected to base frame 101 by springs 122a. The pile heddles are raised and lowered by Jacquard machine 170, including a set of adjustable weights, which is operated by electronic controller 172, to create patterns in the final carpets. The tension on the pile threads is maintained by a beam let off system and the adjustable weights. Preferably, the range for the weights needs to create between about 1.5 kg and about 3 kg tension per pile thread.

The ground warp threads and the pile threads pass over and under lower rapier 125 and upper rapier 127. Lower rapier 125 and upper rapier 127 are responsible for passing a weft threads over and under the threads as they transverse laterally across the weaving machine through the shed. The rapiers move in a continuous cycle, picking up the weft thread on one side of the weaving machine and carrying it across to the other side through the appropriate shed.

The timing of the latitudinal motion of the rapiers sets the pick density of the carpet. The pick density is the number of weft threads per centimeter. Higher pick density results in a higher pile because there are small spaces between the warp and weft which prevents shrinkage of the pile back into the ground weave. A lower pick density results in a lower pile for the opposite reason. The invention preferably requires a pick density between about 35 and 45 weft threads per centimeter and ideally 40 weft threads per centimeter.

The ground warp threads and the pile threads pass across cutting table 126 and cutting table 129 which are supported by upper rail 141 and lower rail 143, respectively. Gap 158 exists between the cutting tables. In a preferred embodiment, gap 158 is maintained between about 16 mm and about 20 mm.

Knife 128 moves linearly and latitudinally back and forth, separating the pile threads as they move through the gap, thereby creating upper carpet 134 and lower carpet 136. Upper carpet 134 moves through tensioning rollers 133 and into upper take-up basket 130. Likewise, lower carpet 136 passes tensioning rollers 131 and is deposited in lower take up basket 132. The tensioning rollers are supported by take up frame 175.

Figure 3:
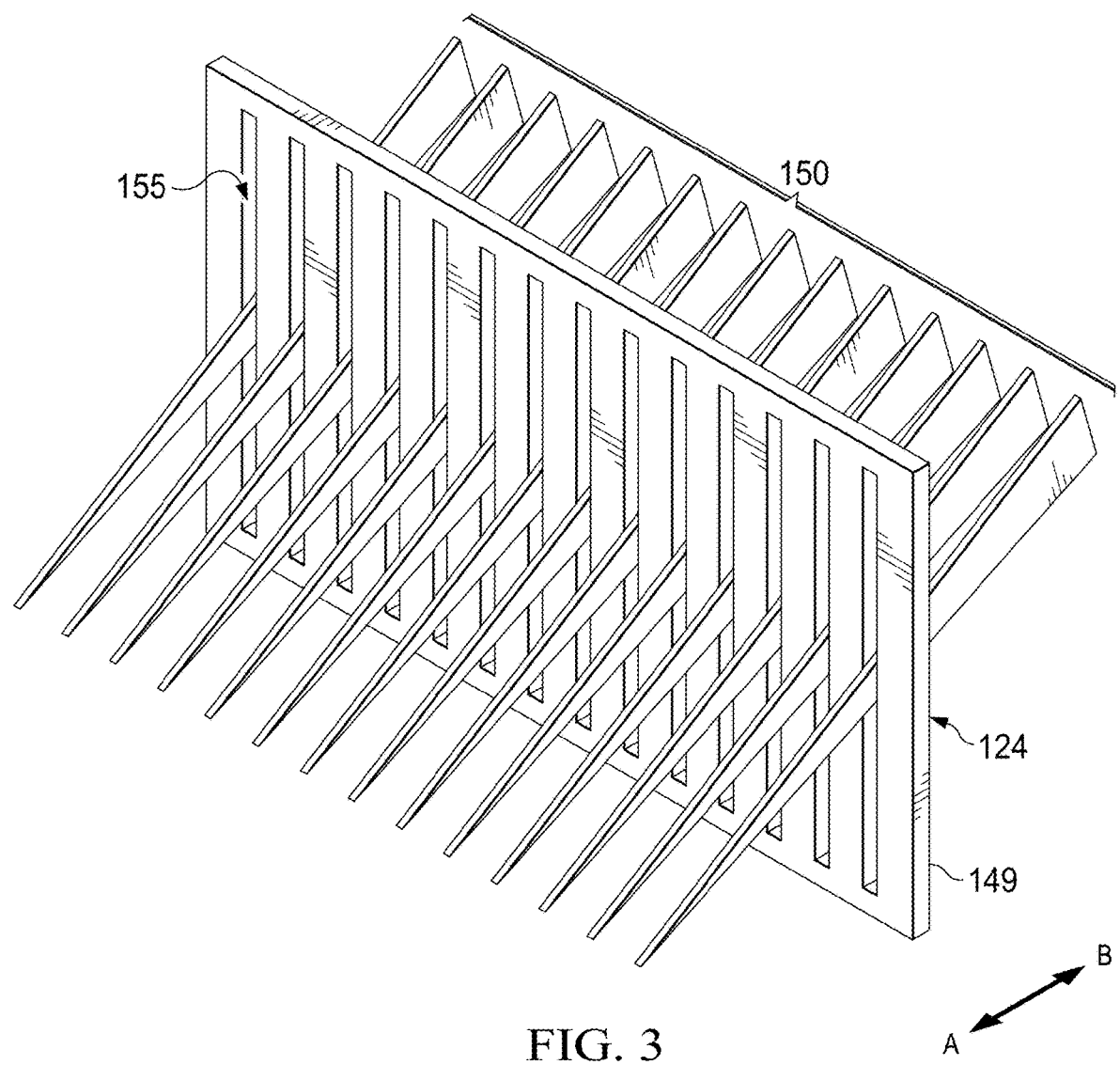
FIG. 3 is a schematic view of a reed and a set of lancets of a preferred embodiment.

Referring also to FIG. 3, reed 124 and lancets 150 will be further described.

Reed 124 is a comb-like device that presses the weft yarn into place after the rapiers have passed, forming the weave. The preferred reed density for the invention is about 320, which means it has 320 dents (spaces for the warp threads) per meter. This is a medium reed density for carpets and allows for the close control of the pile height by other adjustments to the manufacturing process. Other reed densities may be used with varying success.

Reed 124 includes frame 149. Frame 149 includes a series of vertical slots 155 through which each of the pile threads and ground warp threads pass. The reed moves longitudinally, in directions "A" and "B", and packs or "beats" the weft threads against the warp threads for each pass of the rapiers.

Each of pile threads 118 and the ground warp threads pass through slots 155 as they move toward cutting tables 126 and 129.

Lancets 150 function to prevent the ground warp threads from collapsing towards each other under the tension from the pile thread as the carpets move across the cutting table, through the gap, and toward knife 128. Lancets 150 comprise vertically oriented steel strips of varying dimensions, which will be further described, and which are positioned longitudinally, between the warp threads, from lancet holder 152, toward and adjacent cutting tables 126 and 129. The position of the lancets with respect to the cutting tables may be adjusted vertically, in and out of gap 158, as will be further described.

The lancets work in conjunction with other parts of the weaving machine, such as the heddles and the reed, to ensure the correct positioning and movement of the warp threads. This is essential for creating the desired weave structure and randomly varying pile heights of the invention, as will be further described.

The weave structure used for the pile yarn also impacts the varying pile height of the invention. Certain weave structures may pull the yarn tighter, resulting in a lower pile, while others may allow the yarn to loop more freely, creating a higher pile.

Figure 4A:
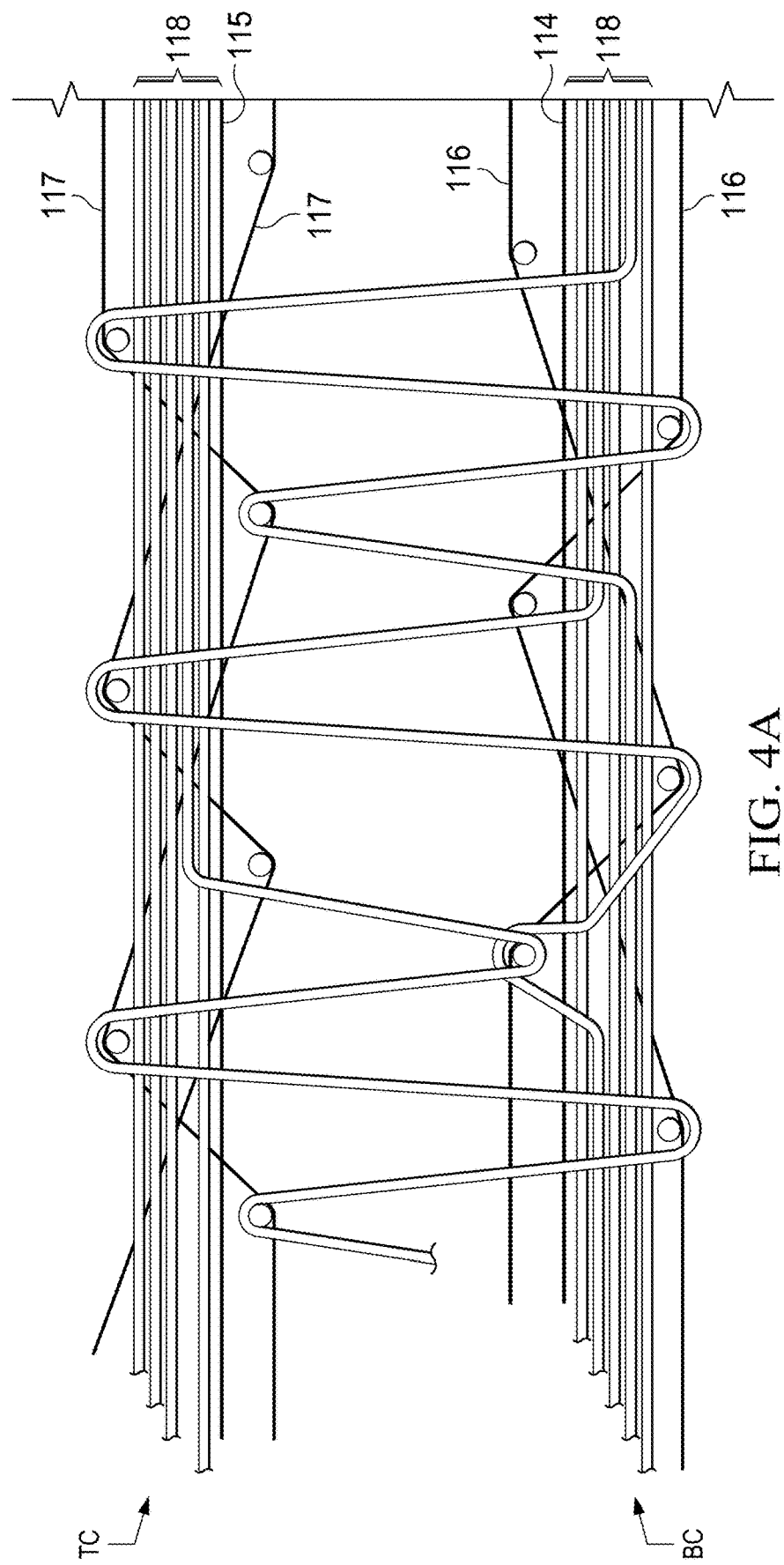
FIG. 4A shows a weave structure of a preferred embodiment.

Referring then to FIG. 4A, the weave structure for carpets of the preferred embodiments will be further described. The preferred embodiment includes a ground weave structure and a pile weave structure. The ground weave structure is known as (1/1)+(2/2), or 1/1 for slack warp threads 114 and 115 and 2/2 for tight warp threads 116 and 117. The pile weave structure is known as 1/1 V, for the pile yarn, exemplified at 118. The 1/1 V structure forms a tuff for every filling and so is well adapted to weave very dense carpets. The "V" indicates a specific arrangement or pattern in the weave that creates a "V-like" shape in the fabric known as a "twill". The weave structure of a preferred embodiment also exhibits floating selvedges. The floating selvedges are extra warps on each side of the carpet that are not threaded into the heddles. Since they are not threaded, they "float" above the warp. These floating warps act as an anchor for the weft threads at the edges of the carpet.

The warp threads preferably consist of synthetic fibers such as polypropylene or polyester due to their strength, elasticity, and resistance to breakage. Alternatively, a blend of synthetic fibers and natural cotton may be employed to enhance flexibility and texture. Tight warp threads generally range from 1000 to 2000 denier, offering robust support, while slack warp threads are slightly thinner, with a denier range of 800 to 1500, allowing for controlled pile height variation. The warp threads exhibit a low twist of 1 to 2 turns per inch to balance durability and flexibility. With tensile strength supporting tensions of 2 to 4 kgf per thread and an elongation rate of approximately 10% to 15%, these specifications ensure the structural integrity necessary.

The weft yarn specifications of the invention complement the warp threads by providing the necessary density and aesthetic appeal of the carpet. Preferred materials for weft yarns include wool, cotton, or synthetic blends such as polypropylene or acrylic, chosen for their resilience and texture. Weft yarns typically fall within the denier range of 600 to 1000, which balances strength and flexibility. A medium twist of 3 to 4 turns per inch ensures that the yarn remains firm while maintaining sufficient pliability for weaving intricate patterns. The pick density for the weft yarns averages between 35 to 45 picks per centimeter, depending on the desired carpet density and pile height. These specifications allow for a tightly woven carpet that retains the antique aesthetic, with tensile strengths of 1.5 to 3 kgf ensuring the durability of the final product.

Figure 4B:
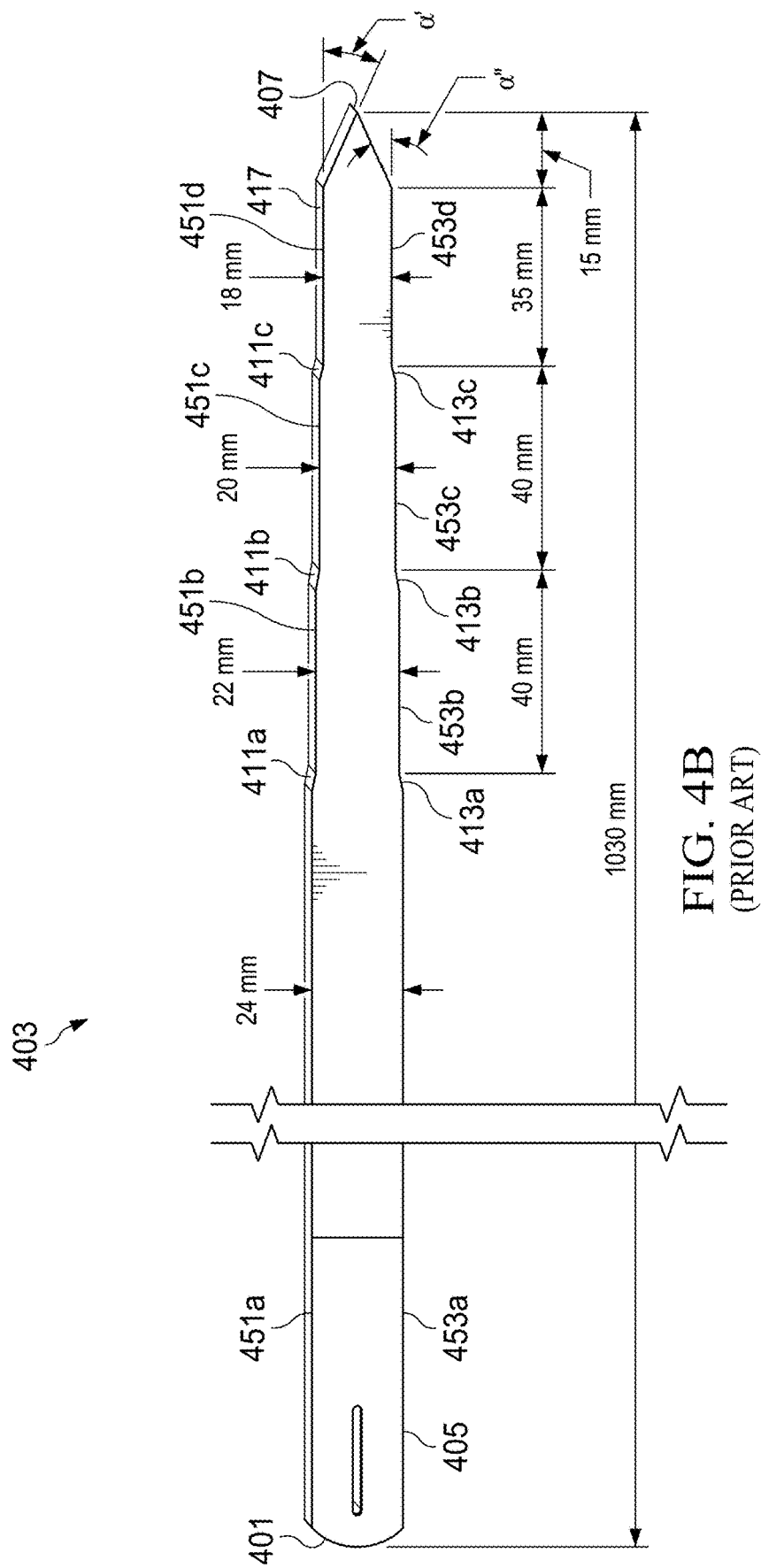
FIG. 4B shows an example of a prior art lancet.

Referring to FIG. 4B, a prior art lancet will be further described.

Prior art lancet 403 includes body 405 connected to tip 407. Body 405 is terminated by upstream end 401, which in use is fixed in the lancet holder. Body 405 and tip 407 are connected by sloped shoulders 411a, 411b, 411c, and 413a, 413b and 413c which connect flat portions 451a, 451b, 451c and 451d and 453a, 453b, 453c and 453d, respectively, forming identical but inverse top and bottom profiles. Tip 407 terminates in a single point having two identical and symmetrical angles α' and α" of about 45°, which, in use, is positioned in the gap and adjacent the knife. Importantly, tip 417 has a width of about 18 mm, which in the prior art is sized to be almost identical to gap 158. Since tip 417 is nearly identical to gap 158, the lancets do not allow variation in pile height as the carpets move past the knife.

Prior art lancet 403 is usually about 0.3 mm in thickness, is typically about 30 mm in height and about 1030 mm long.

Figure 4C:
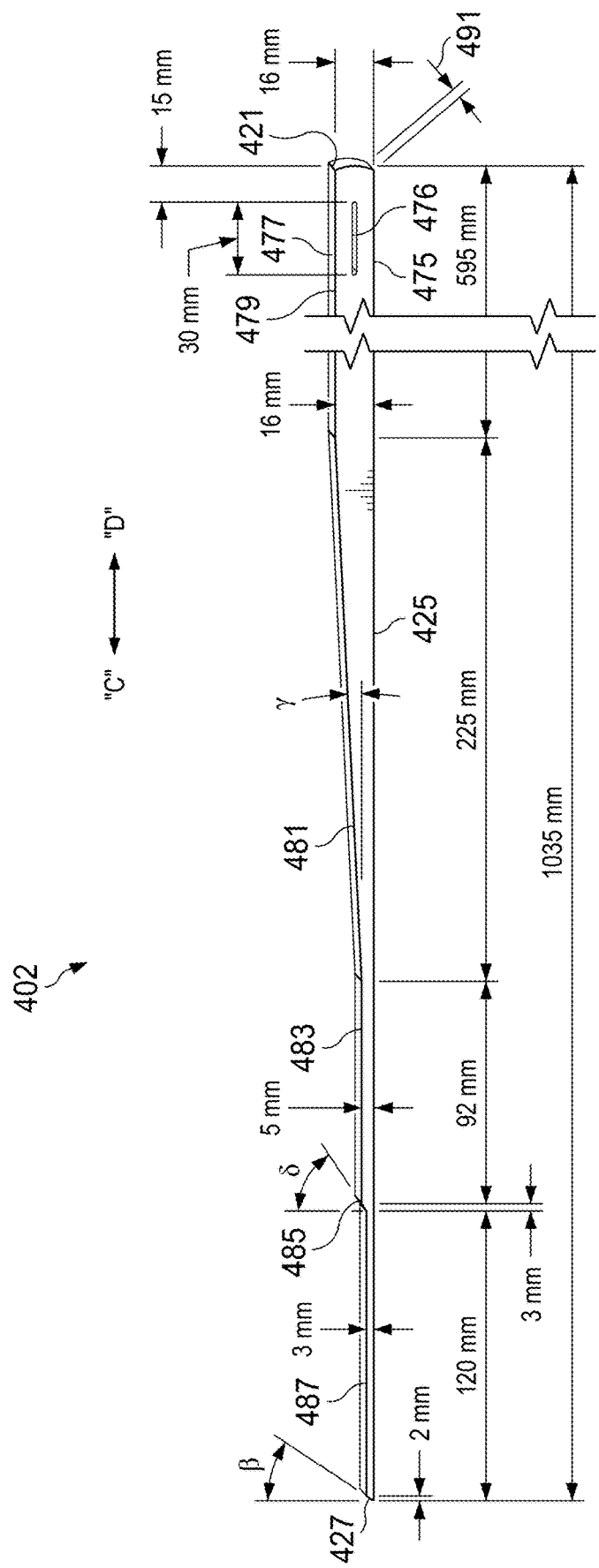
FIG. 4C shows an example of a lancet of a preferred embodiment.

Referring then to FIG. 4C, an example of a preferred embodiment of lancet 402 having a special one-sided "draw-down" profile, will be further described.

Lancet 402 further comprises body 425 beginning at tip 427 ending at upstream end 421. Upstream end 421 is operatively connected to lancet holder 152 when the weaving machine is in operation. In a preferred embodiment, between about 50 and about 75 lancets are used.

Lancet 402 includes adjustment slot 476 centrally and longitudinally positioned in upstream end 421. The adjustment slot allows the position of the lancet to be adjusted at the lancet holder with respect to the cutting tables in vertical directions "C" and "D", as will be further described.

The draw-down profile of lancet 402 includes lower flat surface 475 and upper tiered surface 477. The lower flat surface is constant along the entire length of the lancet. The upper tiered surface includes flat portion 479 connected to incline portion 481, having down angle γ. Incline portion 481 is connected to flat portion 483. Flat portion 483 is connected to flat portion 487 by incline 485, having angle δ. Flat portion 487 is connected to tip 427, having angle β. The preferred lancet has consistent thickness 491 of about 0.3 mm. The other preferred dimensions of the lancet are shown below in Tables 2 and 3.

TABLE 2

| Number | Element | Length | Height |
|---|---|---|---|
| 479 | Flat Portion | About 595 mm | About 16 mm |
| 481 | Incline Portion | About 225 mm | About 16 mm to About 5 mm |
| 483 | Flat Portion | About 92 mm | About 5 mm |
| 485 | Incline Portion | About 3 mm | About 5 mm to About 3 mm |
| 487 | Flat Portion | About 120 mm | About 3 mm |
| 427 | Tip | About 2 mm | About 3 mm |

TABLE 3

| Letter | Angle |
|---|---|
| β | About 45° |
| α | About 45° |
| δ | About 1.5° |

Figure 4D:
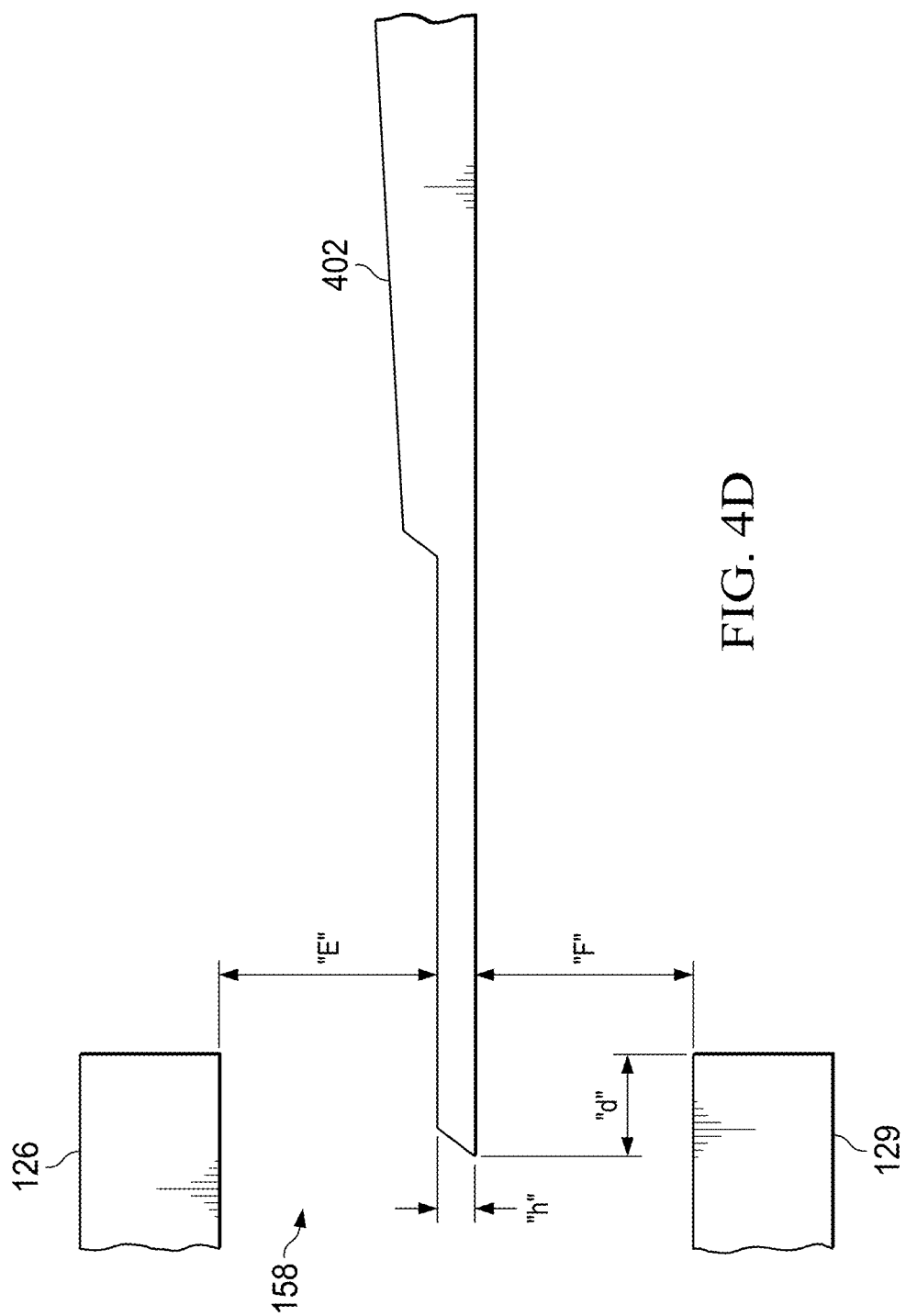
FIG. 4D is a detail of a lancet and cutting table of a weaving machine of a preferred embodiment.

The dimensions of lancet 402 are not mere design choice, but important for the function of the invention. One important feature of the invention is the difference of the shape and dimensions of the lancets used, versus the prior art lancets such as lancet 403. The shape of lancet 402 allows the pile threads to gradually draw the warp thread together to create a potential for extremely low pile height, without binding as the warp moves through the weaving machine. As shown in FIG. 4D, the preferred lancet also demonstrates tip dimensions which provide a clearance "E" below cutting table 126 and a clearance "F" above cutting table 129. In one preferred embodiment, clearances "E" and "F" are about the same. The clearances permit controlled pseudo-random variation in the vertical position of the warps, relative to the cutting tables, as they move over the knife. The height of tip 427, "h", is intentionally, substantially less than gap 158.

In a preferred embodiment, "h" between about 2 mm and about 3 mm and is preferably about 3 mm, while gap 158 is about 18 mm, making clearances "E" and "F" about 7.5 mm to about 8 mm each. The clearances are important because they allow the upper and lower warps to move in the gap between cutting tables 126 and 129, so that the carpets approach the knife pseudo-randomly and thereby achieve different pile heights ranging from the weave structure outward in different areas of each carpet, as will be further described.

Also importantly, overlap distance "d" is the distance that tip 427 is positioned past the edges of the cutting tables. The overlap distance may be changed to affect the frequency of the worn patterns by adjusting the vertical position of the lancets in directions "A" and "B", as will be further described. Preferably, the overlap distance is between about 0 mm and about 20 mm and is preferably about 10 mm. Other overlap distances may be used if required.

Figure 5:
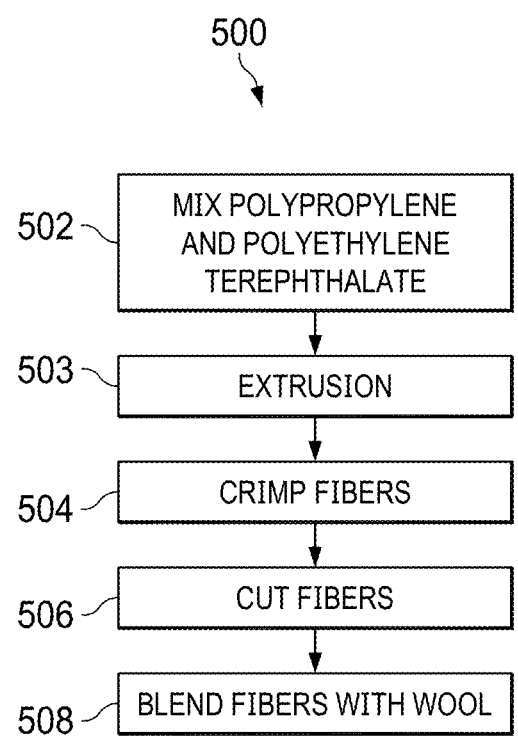
FIG. 5 is a flow chart of a preferred method of producing a preferred pile yarn.

Referring then to FIG. 5, preferred method 500 of preparing the pile threads for the invention will be further described. In general, Some pile materials may have more "spring" or "loft," which affects the pile height. For example, wool yarns can create a plush, high pile, while synthetic yarns like polypropylene might produce a lower, denser pile. Hence, the composition of the pile yarn is important in creating the randomized variation in the pile height in the carpets produced according to the invention.

At step 502, a mixture of evenly mixed polypropylene and polyethylene terephthalate pellets is prepared. Preferably, the mixture includes about 90% polypropylene and about 10% ethylene terephthalate (polyester), respectively.

At step 503, the mixture is extruded into synthetic fiber. Preferably the synthetic fiber demonstrates a denier of between about 8 and about 9.

At step 504, the synthetic fibers are crimped to look like wool. Crimping plastic fibers to resemble wool involves creating a wavy or zigzag pattern in the fibers similar to the natural crimp found in wool. The crimp also provides the fibers with a characteristic springiness and texture of natural wool. Preferably, mechanical crimping tool is used. The preferred mechanical crimping tool employs a series of rollers.

At step 506, the synthetic fibers are cut to an average of about 120 mm in length.

At step 508, the synthetic fibers are blended with wool fibers to provide raw fiber locks. In a preferred embodiment, the blend of the threads is about 90% mixed synthetic fiber and about 10% New Zealand wool of about 37 μm in diameter.

The shrinkage of the pile yarn consisting of 90% synthetic fibers (polypropylene and polyethylene terephthalate) and 10% New Zealand wool with a denier of approximately 3375/1, is an important factor in achieving the desired antique carpet appearance. The blend's shrinkage is influenced by several elements, including fiber composition, the processing tensions applied by the automated weaving machine.

The synthetic fibers in the blend exhibit different shrinkage behaviors. Polypropylene typically has a low shrinkage rate of 1-2% due to its high resistance to heat and moisture.

On the other hand, polyethylene terephthalate can shrink between 3-5% under moderate tension and heat exposure. Combined, these synthetic components form the majority of the yarn and contribute to a relatively stable shrinkage profile.

The natural wool component, which makes up 10% of the yarn, behaves differently. Wool fibers are more susceptible to environmental conditions and can shrink by 8-15%, especially when exposed to hot, humid conditions or tension during processing. This natural variability adds a level of randomness to the pile height, which is essential for replicating the worn, antique look of the carpets.

Given the warp and pile thread tensions applied by the automated weaving machine, which ranges from 1.5 to 3 kg per thread, the combined effect of tension and heat during processing is estimated to induce an overall shrinkage of approximately 3-5% in the pile yarn. This estimation reflects the balance between the synthetic and wool components and their respective responses to processing conditions.

In terms of the final pile height, a shrinkage rate of 3-5% translates to a reduction of approximately 0.09 mm to 0.25 mm for an intended pile height of 3 mm to 5 mm. This controlled yet pseudo-random shrinkage effect plays a pivotal role in achieving the distinctive visual and textural characteristics of antique carpets.

Figure 6:
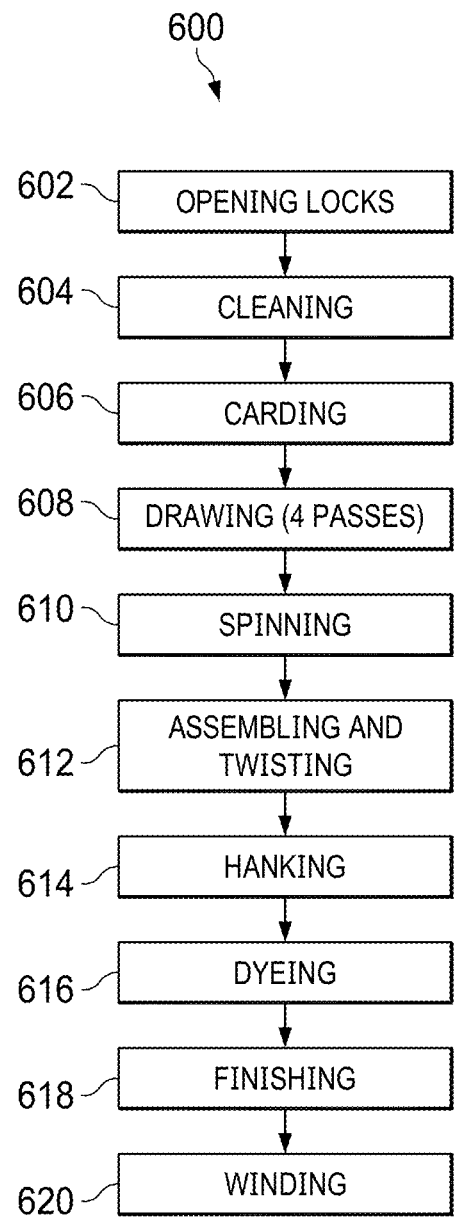
FIG. 6 is a flow chart of a method of processing a preferred pile yarn.

Referring to FIG. 6, preferred method 600 of processing the pile yarn will be further described. In general, the thickness of the yarn directly influences the height of the pile. Thicker yarns will naturally create a higher pile. Thinner yarns create a lower pile. The invention creates random areas of zero pile height alternating with pile heights of between about 3 mm to about 5 mm.

At step 602, the raw fiber locks are "opened". The fibers are "opened" to separate them from their clumped state.

At step 604, the opened fibers are cleaned. Cleaning the opened fibers removes contaminants and debris.

At step 606, the cleaned fibers are "carded". Carding detangles and aligns the fibers to separate and straighten them and so make them easier to spin. Preferably, this is done using a semi-worsted carding machine.

At step 608, the carded fibers are "drawn". Drawing the carded fibers places them under tension to reduce their diameter and further aligns and prepares them for spinning. Preferable, the fibers are drawn to a diameter of about 0.3 dtex to about 1.0 dtex or about 5 μm to about 10 μm.

At step 610, the fibers are "spun". Spinning the drawn fibers creates the yarn by twisting the fibers together to give them strength and cohesion. Preferably, the spinning results in a yarn of about 1125/1 denier and between about 5.5 to about 6.5 wraps per inch in the "Z" direction. The "Z" direction twist is created when the yarn is unwrapped from the spool in a counterclockwise direction.

At step 612, the individual yarn strands are combined into one, which increases the thickness and durability of the yarn. The yarn is then twisted in a direction opposite to the twist of the individual strands. Twisting increases its final count, strength and determines the texture and appearance of the yarn. The final count is about 1125/3 denier (or about 3375/1 denier). The preferred angle of twist is between about 5 and about 7. The final twist is about 4 to 5 wraps per inch in the "S" direction. The "S" direction twist is created when the yarn is unwrapped from the spool in a clockwise direction.

At step 614, the twisted yarn is "hanked". Hanking the twisted yarn coils it onto a large loop known as a hank.

At step 616, the yarn is dyed. Dyeing the hanks of yarn is accomplished in a novel two-stage process where the yarn is processed in different solutions to provide a unique "2-color" yarn with special characteristics, as will be further described.

At step 618, after dyeing, the yarn undergoes a finishing process. In a preferred embodiment, the yarn is washed in a pure water bath for about 15 minutes. The pH of the water bath is then adjusted to between about 5 and 6 by titrating with 99% pure acetic acid. A softener is then added to the solution and the temperature is stabilized at about 40° C. Preferably the softener is a silicon based or reactive softener such as polyquaternium-33 or pentasodium pentenate. After stabilization, the temperature of the solution is raised to about 50° C. and held there for about 20 minutes. The yarn is then dried and heat set to set a permanent twist into the yarn, typically at about 90° C. for about 1 hour.

At step 620, the finished yarn is wound onto bobbins or spools, making it ready for use in carpet production. An antistatic compound is added to the yarn during winding to facilitate weaving in the weaving machine.

Figure 7A:
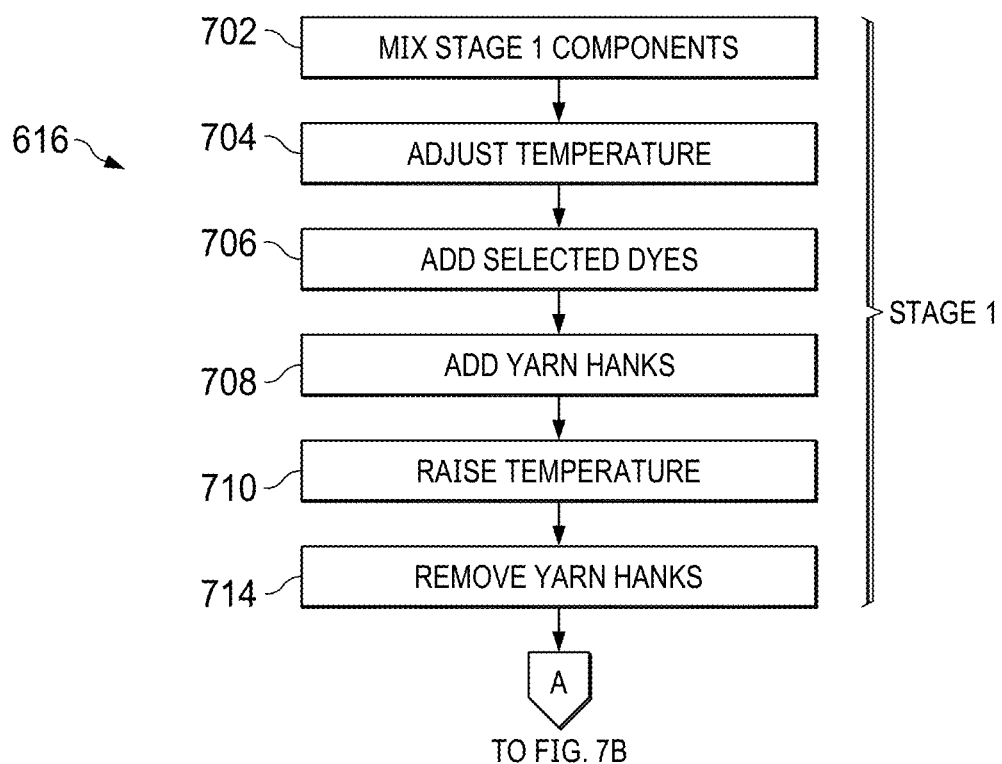
FIGS. 7A and 7B is a flow chart of a method of dyeing a preferred pile yarn.
Figure 7B:
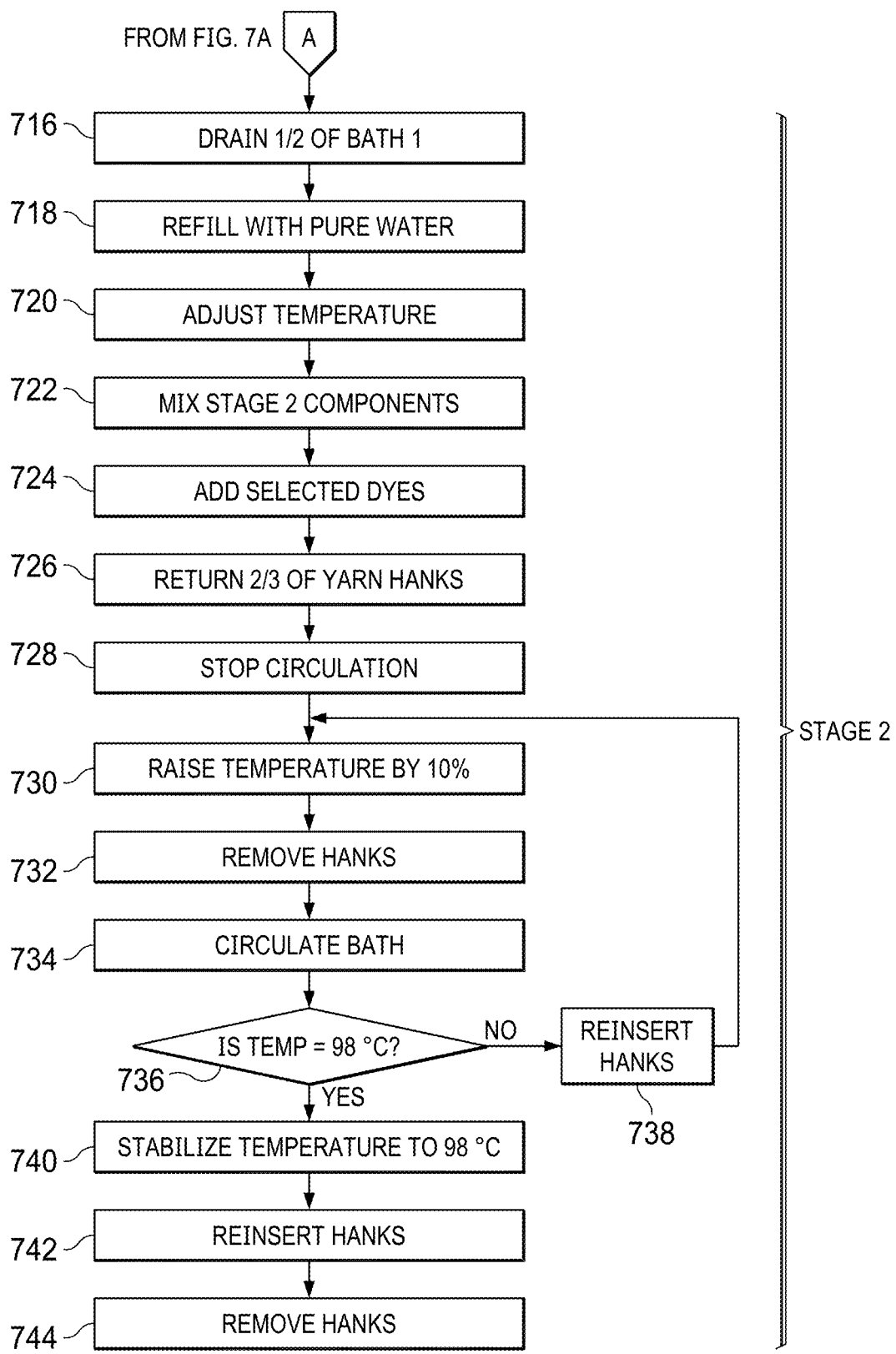

Referring to FIGS. 7A and 7B, the method of dyeing yarn, as described in step 616, for use in the invention, will be further described.

At step 702, the Stage 1 dye bath is prepared including a buffer, a carrier, a leveling agent, a dispensing agent and an anti-moth agent, as will be further described.

At step 704, the bath temperature is adjusted to about 40° C.

At step 706, selected dyes are added to the bath, as will be further described. Preferably the dye is created using a combination of natural and synthetic elements to produce the desired hue. For example, natural elements for red, blue and yellow dye include cochineal, indigo leaves, turmeric root, respectively. Examples of synthetic dye elements for red, blue and yellow dyes each include organic metallic compounds of polyvalent transition metals capable of forming chelates such as hexaaquachromium(111), $[Cr(H_2O)_6]^{3+}$, as will be further described.

At step 708, the first set of yarn hanks are added to the bath.

At step 710, the temperature of the bath is raised to 98° C. by about one degree per minute and held there for about 20 minutes to about 40 minutes according to the depth of color desired. During this process, all circulation pumps are set to maximum.

At step 714, the yarn hanks are removed from the bath and Stage 1 concludes.

At step 716, half of the Stage 1 bath is drained, and Stage 2 begins.

At step 718, the bath is refilled with pure water.

At step 720, the temperature of the bath is adjusted to about 60° C.

At step 722, the Stage 2 bath components including a detergent, a carrier, a leveling agent, a dispersing agent and a wetting agent are mixed into solution, as will be further described.

At step 724, selected dyes are added to the solution, as will be further described. Preferably the dye is created using a combination of natural and synthetic elements to produce a hue lighter than the Stage 1 bath.

At step 726, two-thirds of the yarn hanks, chosen at random from the first set of yarn hanks, are introduced into the Stage 2 bath as the second set of yarn hanks.

At step 728, the circulation pumps are stopped.

At step 730, the temperature of the solution is raised by about 10°.

At step 732, after the solution has been raised by about 10°, the second set of yarn hanks is removed from solution.

At step 734, the bath is circulated with full circulation pumps for about 5 minutes.

At step 736, the temperature is monitored to determine whether or not it is equal to about 98° C. If it is, the process moves to step 740. If not, the process moves to step 738.

At step 738, the second set of yarn hanks is reinserted into the Stage 2 bath. The method then returns to step 730.

At step 740, the temperature of the Stage 2 bath is stabilized to about 98° C.

At step 742, the second set of yarn hanks is reinserted in the Stage 2 bath at about 98° C., for between about 20 and about 40 minutes.

At step 744, the second set of yarn hanks is removed from solution and Stage 2 concludes.

Referring to Tables 4-13, the preferred recipes for each of the Stage 1 and Stage 2 baths for each preferred color are identified. As one of skill will recognize, the Stage 1 dye concentrations differ from the Stage 2 dye concentrations. These differences are important because they produce a varying color hue across the cross-section of the yarn, generally darker in some shades on the inside, and lighter on the outside which mimics normal "fading" of the pile yarn due to aging in antique carpets.

TABLE 4

| | | Color No. Component | 2365 Recipe | Rust P |
|---|---|---|---|---|
| | | 1st Stage | | |
| Dye 1 | | Acetic Acid | 1.0000 | gr/Liter |
| | | Sodium Acetate | 2.0000 | gr/Liter |
| | | Levegal ®-BLD | 0.5000 | gr/Liter |
| | | Eulan ® SPA01 | 0.0750 | % |
| | | Tanavol ™ DAP | 0.5000 | % |
| | | Foron ® Brill Yellow SE-RD | 0.0551 | % |
| | | Foron ® Red SE-RD | 0.0428 | % |
| | | Foron ® Blue SE-RDN | 0.0159 | % |
| | | 2nd Stage | | |
| | | Emerol A270 | 0.5000 | gr/Liter |
| | | Periwet SLN | 0.1000 | gr/Liter |
| | | Levegal ®-BLD | 0.5000 | gr/Liter |
| | | Tanavol ™ DAP | 0.5000 | % |
| | | Foron ® Brill Yellow SE-RD | 0.0450 | % |
| | | Foron ® Red SE-RD | 0.0439 | % |
| | | Foron ® Blue SE-RDN | 0.0064 | % |
| | | Sprovel L M | 3.0000 | % |

TABLE 5

| | | Color No. Component | 2378 Recipe | Light Grey P |
|---|---|---|---|---|
| | | 1st Stage | | |
| Dye 2 | | Acetic Acid | 1.0000 | gr/Liter |
| | | Sodium Acetate | 2.0000 | gr/Liter |
| | | Levegal ®-BLD | 0.5000 | gr/Liter |
| | | Eulan ® SPA01 | 0.0750 | % |
| | | Tanavol ™ DAP | 0.5000 | % |
| | | Foron ® Brill Yellow SE-RD | 0.0099 | % |
| | | Foron ® Red SE-RD | 0.0052 | % |
| | | Foron ® Blue SE-RDN | 0.0067 | % |
| | | 2nd Stage | | |
| | | Emerol A270 | 0.5000 | gr/Liter |
| | | Periwet SLN | 0.1000 | gr/Liter |
| | | Levegal ®-BLD | 0.5000 | gr/Liter |
| | | Tanavol ™ DAP | 0.5000 | % |
| | | Foron ® Brill Yellow SE-RD | 0.0097 | % |

TABLE 5-continued

| Color No. | | 2378 | Light Grey |
|---|---|---|---|
| Component | | Recipe | P |
| Foron ® Red SE-RD | | 0.0046 | % |
| Foron ® Blue SE-RDN | | 0.0090 | % |
| Sprovel L M | | 3.0000 | % |

TABLE 6

| | Color No. | | 2379 | Sky |
|---|---|---|---|---|
| | Component | | Recipe | P |
| | 1st Stage | | | |
| Dye 3 | Acetic Acid | | 1.0000 | gr/Liter |
| | Sodium Acetate | | 2.0000 | gr/Liter |
| | Levegal ®-BLD | | 0.5000 | gr/Liter |
| | Eulan ® SPA01 | | 0.0750 | % |
| | Tanavol ™ DAP | | 0.5000 | % |
| | Foron ® Brill Yellow SE-RD | | 0.0111 | % |
| | Foron ® Red SE-RD | | 0.0038 | % |
| | Foron ® Blue SE-RDN | | 0.0116 | % |
| | 2nd Stage | | | |
| | Emerol A270 | | 0.5000 | gr/Liter |
| | Levegal ®-BLD | | 0.5000 | gr/Liter |
| | Periwet SLN | | 0.1000 | gr/Liter |
| | Tanavol ™ DAP | | 0.5000 | % |
| | Foron ® Brill Yellow SE-RD | | 0.0151 | % |
| | Foron ® Red SE-RD | | 0.0048 | % |
| | Foron ® Blue SE-RDN | | 0.0165 | % |
| | Sprovel L M | | 3.0000 | % |

TABLE 7

| | Color No. | | 2380 | Light Brown |
|---|---|---|---|---|
| | Component | | Recipe | P |
| | 1st Stage | | | |
| Dye 4 | Acetic Acid | | 1.0000 | gr/Liter |
| | Sodium Acetate | | 2.0000 | gr/Liter |
| | Levegal ®-BLD | | 0.5000 | gr/Liter |
| | Eulan ® SPA01 | | 0.0750 | % |
| | Tanavol ™ DAP | | 0.5000 | % |
| | Foron ® Brill Yellow SE-RD | | 0.0370 | % |
| | Foron ® Red SE-RD | | 0.0141 | % |
| | Foron ® Blue SE-RDN | | 0.0099 | % |
| | 2nd Stage | | | |
| | Emerol A270 | | 0.5000 | gr/Liter |
| | Periwet SLN | | 0.1000 | gr/Liter |
| | Levegal ®-BLD | | 0.5000 | gr/Liter |
| | Tanavol ™ DAP | | 0.5000 | % |
| | Foron ® Brill Yellow SE-RD | | 0.0161 | % |
| | Foron ® Red SE-RD | | 0.0068 | % |
| | Foron ® Blue SE-RDN | | 0.0074 | % |
| | Sprovel L M | | 3.0000 | % |

TABLE 8

| | Color No. | | 2381 | Ivory |
|---|---|---|---|---|
| | Component | | Recipe | P |
| | 1st Stage | | | |
| Dye 5 | Acetic Acid | | 1.0000 | gr/Liter |
| | Sodium Acetate | | 2.0000 | gr/Liter |
| | Levegal ®-BLD | | 0.5000 | gr/Liter |
| | Eulan ® SPA01 | | 0.0750 | % |
| | Tanavol ™ DAP | | 0.5000 | % |
| | Foron ® Brill Yellow SE-RD | | 0.0037 | % |

TABLE 8-continued

| Color No. | 2381 | Ivory |
|---|---|---|
| Component | Recipe | P |
| Foron ® Red SE-RD | 0.0016 | % |
| Foron ® Blue SE-RDN | 0.0018 | % |
| 2nd Stage | | |
| Levegal ®-BLD | 0.5000 | gr/Liter |
| Tanavol ™ DAP | 0.5000 | % |
| Foron ® Brill Yellow SE-RD | 0.0055 | % |
| Foron ® Red SE-RD | 0.0024 | % |
| Foron ® Blue SE-RDN | 0.0017 | % |
| Sprovel L M | 3.0000 | % |

TABLE 9

| | Color No. | | 2382 | Brown |
|---|---|---|---|---|
| | Component | | Recipe | P |
| | 1st Stage | | | |
| Dye 6 | Acetic Acid | | 1.0000 | gr/Liter |
| | Sodium Acetate | | 2.0000 | gr/Liter |
| | Levegal ®-BLD | | 0.5000 | gr/Liter |
| | Eulan ® SPA01 | | 0.0750 | % |
| | Tanavol ™ DAP | | 0.5000 | % |
| | Foron ® Brill Yellow SE-RD | | 0.0566 | % |
| | Foron ® Red SE-RD | | 0.0214 | % |
| | Foron ® Blue SE-RDN | | 0.0305 | % |
| | 2nd Stage | | | |
| | Levegal ®-BLD | | 0.5000 | gr/Liter |
| | Tanavol ™ DAP | | 0.5000 | % |
| | Foron ® Brill Yellow SE-RD | | 0.0293 | % |
| | Foron ® Red SE-RD | | 0.0164 | % |
| | Foron ® Blue SE-RDN | | 0.0333 | % |
| | Sprovel L M | | 3.0000 | % |

TABLE 10

| | Color No. | | 2383 | Dark Grey |
|---|---|---|---|---|
| | Component | | Recipe | P |
| | 1st Stage | | | |
| Dye 7 | Acetic Acid | | 1.0000 | gr/Liter |
| | Sodium Acetate | | 2.0000 | gr/Liter |
| | Levegal ®-BLD | | 0.5000 | gr/Liter |
| | Eulan ® SPA01 | | 0.0750 | % |
| | Tanavol ™ DAP | | 0.5000 | % |
| | Foron ® Brill Yellow SE-RD | | 0.0349 | % |
| | Foron ® Red SE-RD | | 0.0188 | % |
| | Foron ® Blue SE-RDN | | 0.0435 | % |
| | 2nd Stage | | | |
| | Levegal ®-BLD | | 0.5000 | gr/Liter |
| | Tanavol ™ DAP | | 0.5000 | % |
| | Foron ® Brill Yellow SE-RD | | 0.0485 | % |
| | Foron ® Red SE-RD | | 0.0253 | % |
| | Foron ® Blue SE-RDN | | 0.0711 | % |
| | Sprovel L M | | 3.0000 | % |

TABLE 11

| | Color No. | | 2384 | Blue |
|---|---|---|---|---|
| | Component | | Recipe | P |
| | 1st Stage | | | |
| Dye 8 | Acetic Acid | | 1.0000 | gr/Liter |
| | Sodium Acetate | | 2.0000 | gr/Liter |
| | Levegal ®-BLD | | 0.5000 | gr/Liter |
| | Tanavol ™ DAP | | 0.5000 | % |

TABLE 11-continued

| Color No.<br>Component | 2384<br>Recipe | Blue<br>P |
|---|---|---|
| Eulan ® SPA01 | 0.0750 | % |
| Foron ® Brill Yellow SE-RD | 0.0250 | % |
| Foron ® Red SE-RD | 0.0080 | % |
| Foron ® Blue SE-RDN | 0.0418 | % |
| 2nd Stage | | |
| Levegal ®-BLD | 0.5000 | gr/Liter |
| Tanavol ™ DAP | 0.5000 | % |
| Foron ® Brill Yellow SE-RD | 0.0087 | % |
| Foron ® Red SE-RD | 0.0072 | % |
| Foron ® Blue SE-RDN | 0.0384 | % |
| Sprovel L M | 3.0000 | % |

TABLE 12

| | Color No.<br>Component | 2385<br>Recipe | Rose<br>P |
|---|---|---|---|
| | 1st Stage | | |
| Dye 9 | Acetic Acid | 1.0000 | gr/Liter |
| | Sodium Acetate | 2.0000 | gr/Liter |
| | Levegal ®-BLD | 0.5000 | gr/Liter |
| | Eulan ® SPA01 | 0.0750 | % |
| | Tanavol ™ DAP | 0.5000 | % |
| | Foron ® Brill Yellow SE-RD | 0.0340 | % |
| | Foron ® Red SE-RD | 0.0166 | % |
| | Foron ® Blue SE-RDN | 0.0071 | % |
| | 2nd Stage | | |
| | Levegal ®-BLD | 0.5000 | gr/Liter |
| | Emerol A270 | 0.5000 | gr/Liter |
| | Periwet SLN | 0.1000 | gr/Liter |
| | Tanavol ™ DAP | 0.5000 | % |

TABLE 12-continued

| Color No.<br>Component | 2385<br>Recipe | Rose<br>P |
|---|---|---|
| Foron ® Red SE-RD | 0.0019 | % |
| Foron ® Blue SE-RDN | 0.0043 | % |
| Sprovel L M | 3.0000 | % |

TABLE 13

| | Color No.<br>Component | 2401<br>Recipe | Dark Rust<br>P |
|---|---|---|---|
| | 1st Stage | | |
| Dye 10 | Acetic Acid | 1.0000 | gr/Liter |
| | Sodium Acetate | 2.0000 | gr/Liter |
| | Eulan ® SPA01 | 0.0750 | % |
| | Levegal ®-BLD | 0.5000 | gr/Liter |
| | Tanavol ™ DAP | 0.5000 | % |
| | Foron ® Brill Yellow SE-RD | 0.0650 | % |
| | Foron ® Red SE-RD | 0.0690 | % |
| | Foron ® Blue SE-RDN | 0.0210 | % |

TABLE 13-continued

| Color No.<br>Component | 2401<br>Recipe | Dark Rust<br>P |
|---|---|---|
| 2nd Stage | | |
| Levegal ®-BLD | 0.5000 | gr/Liter |
| Tanavol ™ DAP | 0.5000 | % |
| Emerol A270 | 0.5000 | gr/Liter |
| Periwet SLN | 0.1000 | gr/Liter |
| Foron ® Brill Yellow SE-RD | 0.0470 | % |
| Foron ® Red SE-RD | 0.0851 | % |
| Foron ® Blue SE-RDN | 0.0191 | % |
| Sprovel L M | 3.0000 | % |

Levegal® is available from Tanatex Chemicals B.V. of Ede, Netherlands. Tanavol™ is available from Tanatex Chemicals B.V. of Ede, Netherlands. Eulan® is available from Tanatex Chemicals B.V. of Ede, Netherlands. Foron® is available from Archroma of Pratteln, Switzerland.

Figure 8A:
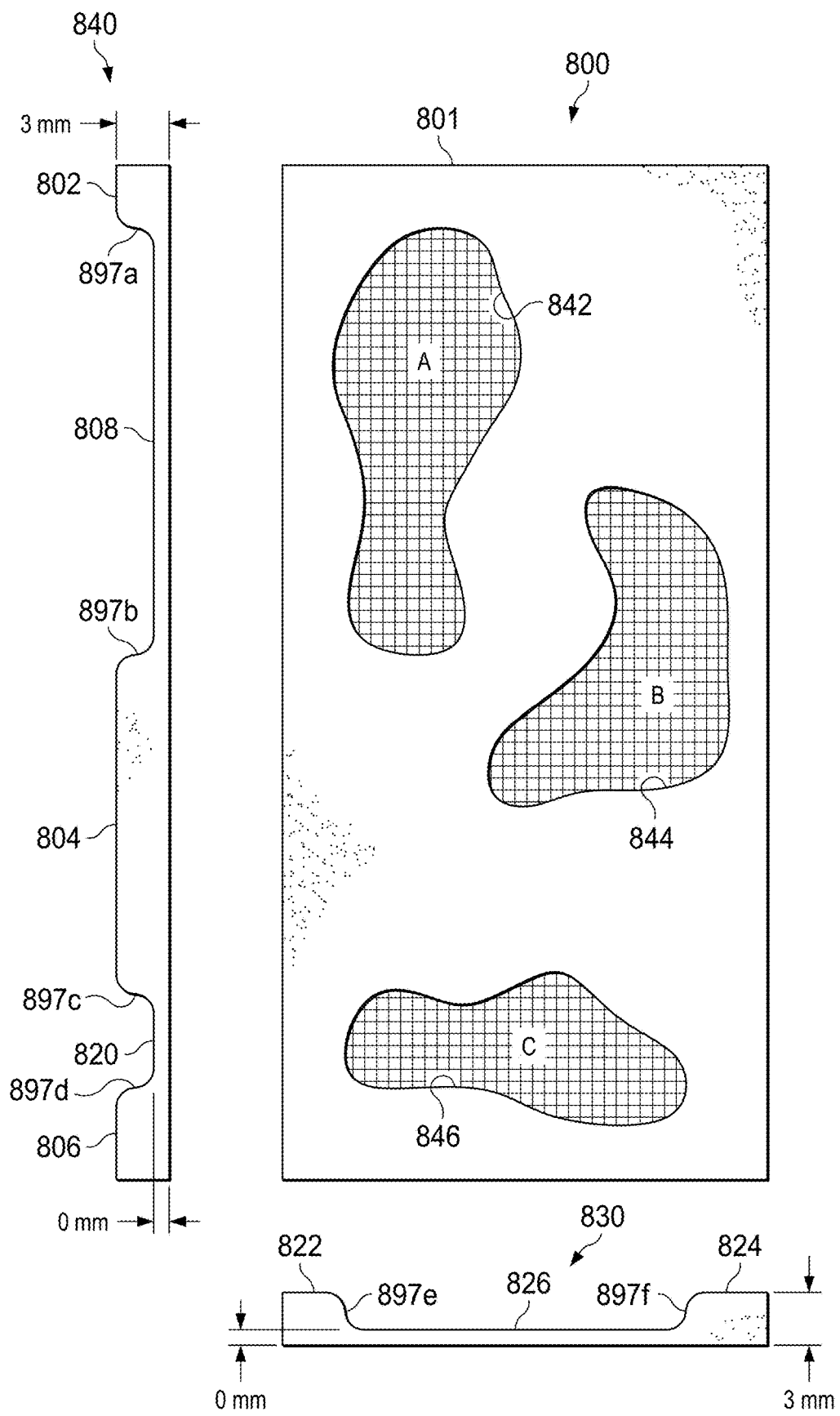
FIGS. 8A and 8B show examples of an antique-style carpet produced by the invention.
Figure 8B:
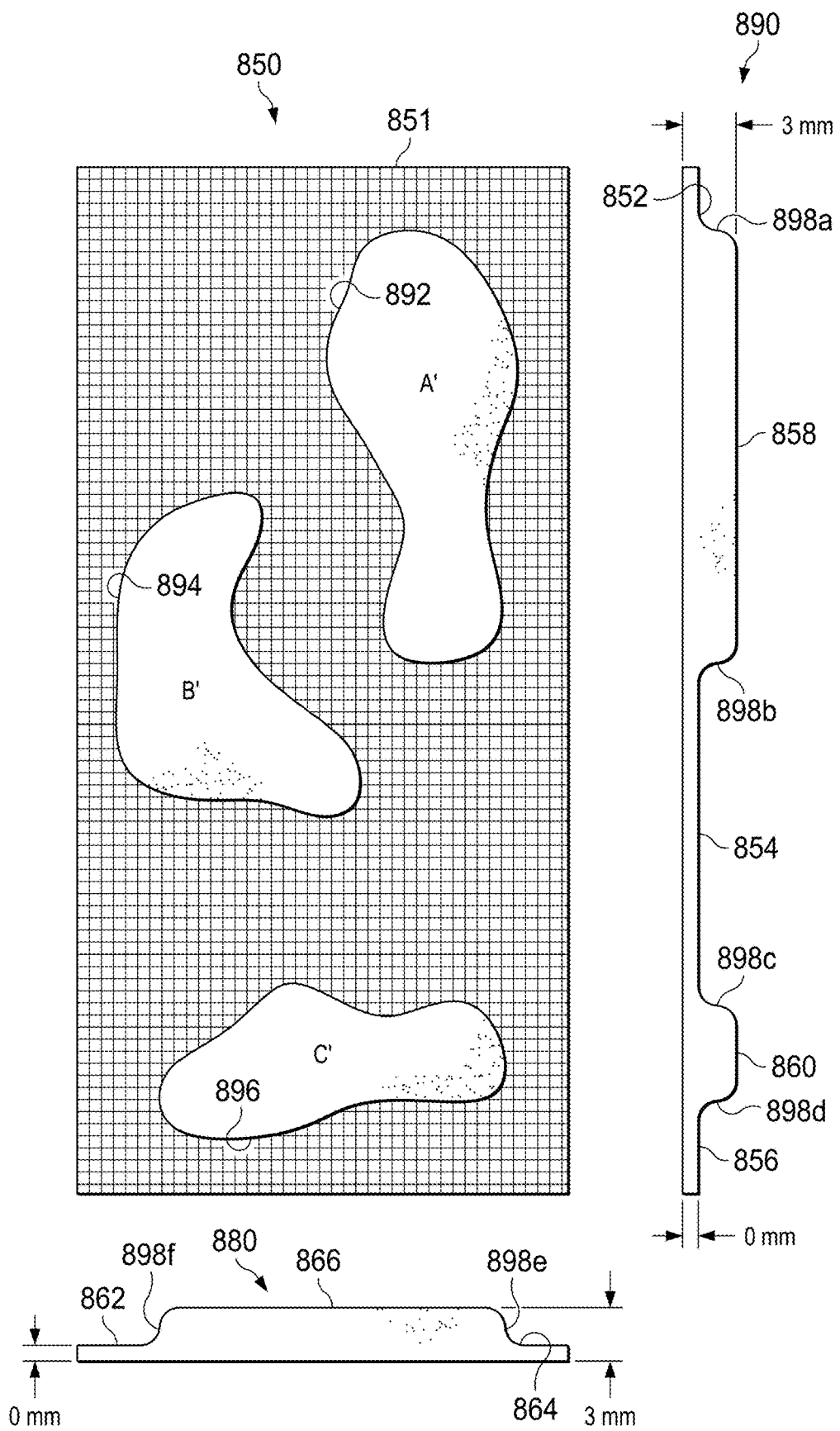
Figure 8C:
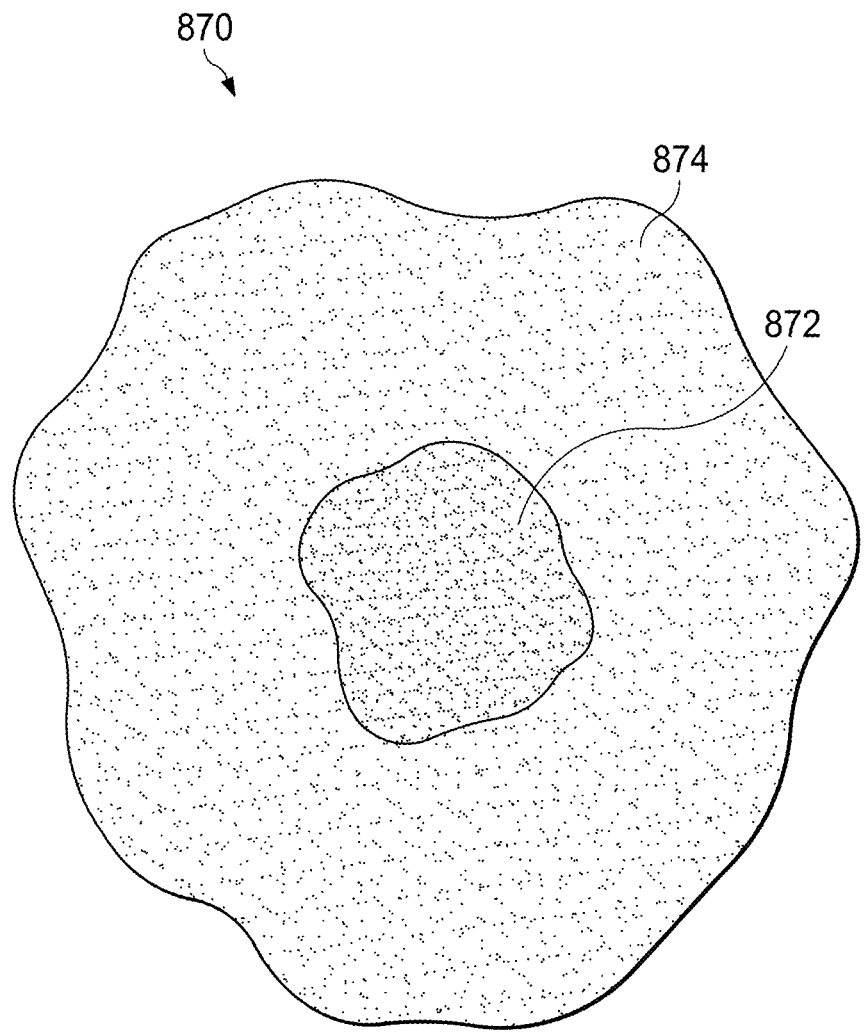
FIG. 8C is a cross-section of a preferred yarn.

Referring to FIG. 8C, a schematic cross-section view of yarn produced by this process is shown. Interior core 872 of yarn 870 is generally darker than outside diameter 874 of the yarn due to the relative concentrations of dye in the Stage 1 and Stage 2 baths. The yarn provided by the novel process of dyeing demonstrated by the invention is important because it produces a "multi-colored" effect across the cross-section of the yarn. As the pile yarn is cut in final processing, differing colors are exposed, thereby increasing the antique look and feel of the carpets.

In a preferred embodiment, the characteristics of the yarn produced by the process of the invention can be summarized in Tables 14 and 15 below.

TABLE 14

| | Max | Min | Average | CV % |
|---|---|---|---|---|
| Breaking Load | 4.69 kgf | 3.7 kgf | 4.2 kgf | About 6.8% |
| Tenacity | 11.7 gram/tex | 9.3 gram/tex | 10.5 gram/tex | About 6.6% |
| Elongation | 24.5% | 20% | 22.25% | About 5.8% |

TABLE 15

| | Average |
|---|---|
| Yarn Count | ASTM D1907/1907 MM-12 |
| Strength and Elongation | ASTM D 2256-97 |
| Final Cone Weight | 1 kg to 0.750 kg |

Breaking load refers to the maximum force that a yarn can withstand before it breaks, and it is a critical parameter in determining the mechanical strength and durability of the yarn. A balanced breaking load is essential because it ensures the yarn can endure the high tensions and mechanical stresses involved in the automated weaving processes without snapping, thereby contributing to the consistent quality and longevity of the carpets.

Elongation refers to the extent a yarn can stretch under tension before breaking, expressed as a percentage of its original length. A balanced elongation is crucial because it allows the yarn to absorb stress during weaving and usage, ensuring flexibility and resilience while maintaining the structural integrity and aesthetic consistency of the final carpet product.

Yarn tenacity is a measure of a yarn's strength relative to its linear density, typically expressed in grams/tex. A "tex"

unit represents the mass in grams of 1000 meters of yarn. When the tenacity of a yarn is 10.5 grams/tex, it means that for every tex of the yarn's linear density, it can withstand a force of 10.5 grams before breaking. This measure provides a measure of the yarn's ability to endure tension and mechanical stress during both the manufacturing process and the lifespan of the final product.

High tenacity, such as the 10.5 grams/tex described here, is essential for ensuring the durability and longevity of carpets, especially those subject to heavy use. It allows the yarn to maintain the structural integrity of the pile and the overall fabric, contributing to the carpet's ability to withstand wear and retain its aesthetic appeal over time. Thus, this level of tenacity also makes the yarn ideal for use in variable pile carpets produced.

Moreover, the process of pile yarn preparation of the invention is important because it produces a coefficient of variation (CV %) in various yarn parameters which balances breaking load, elongation and tenacity. Generally, a lower CV % indicates a more uniform yarn. Conversely, a higher CV %, such as that demonstrated by the yarn produced by the processes disclosed, indicates greater variability in the yarn. The preferred level of variation ensures sufficient uniformity for the consistent pile performance required for the automated weaving machine, but also allows sufficient pseudo-random variation so that manufacturing with the settings of the automated weaving machine as described produce the antique or worn aesthetic appeal desired in the final carpets. Hence, the invention utilizes a carefully controlled CV % in breaking load, elongation and tenacity to allow close but pseudo-random variation in pile height. Both the braking load, elongation and tenacity of the yarn varies sufficiently so that if processed as set out above, a zero-pile height "worn" and "unworn" pattern is produced which simulates normal and expected antique carpet wear.

Referring then to FIGS. 8A and 8B, an example of a preferred embodiment of an upper carpet and a lower carpet produced by the process of the invention will be further described.

FIG. 8A depicts lower carpet 800, having perimeter 801. FIG. 8A further depicts end view 830 of lower carpet 800 and side view 840 of lower carpet 800.

Lower carpet 800 includes "worn" areas A, B, and C. As can be seen from side view 840, "worn" or "lowered" area A demonstrates about 0 mm pile height, at 808, through which the carpet weft and warp are exposed. Worn area B likewise demonstrates about 0 mm pile height. Likewise, referring to view 830, and view 840, worn area C, demonstrates a pile height of about 0 mm at 820 and 826. The remainder of carpet 800, shown in view 840 at 802, 804 and 806, and view 830 at 822 and 824, demonstrates "unworn" or "raised" areas of approximately about 3 mm pile height. Just as important to the aesthetic appearance of the carpets are the transition zones that exist between each of the worn areas and the unworn areas. The transition zones are areas of gradual change between pile heights such as transition zones 897a, 897b, 897c, 897d, 897e and 897f. Preferably each zone has a width of between about 3 cm and about 5 cm.

Worn areas A, B, and C, are examples only. The worn areas can occur in any number of shapes and sizes, subject to certain general statistical characteristics which should be maintained to create the proper aesthetic appearance of the final carpet.

In a preferred embodiment, the carpet should have defined areas such that the size, shape and distribution of the worn areas are similar, yet random in appearance. Furthermore, each carpet produced by the process will be different, thus increasing the uniqueness and value of the carpets produced. For example, worn area A includes perimeter 842, worn area B includes perimeter 844, and worn area C includes perimeter 846. The perimeter of each of the worn areas should be between about 10% and about 30% of perimeter 801 and should not overlap. Likewise, the total area of the worn areas should be between about 20% and about 60% of the total area of the carpet.

FIG. 8B depicts upper carpet 850. In this example, upper carpet 850 and lower carpet 800 were produced by the automated weaving machine at the same time. Hence, upper carpet 850, having perimeter 851, is a mirror image of lower carpet 800 and shares a similar but inverse physical appearance. In general, low pile heights on lower carpet 800 are high pile heights on upper carpet 850. Likewise, high pile heights on lower carpet 800 are low pile heights on upper carpet 850. For example, unworn areas A', B', and C' on lower carpet 800 generally correspond to worn areas A, B and C on upper carpet 850. In this case, upper carpet 850 includes "unworn" or "raised" areas A', B', and C' having perimeters 892, 894 and 896, respectively. As can be seen from side view 890, raised area A' demonstrates a 3 mm pile height 808. Likewise, referring to view 880 and view 890, raised area C' demonstrates a pile height of about 3 mm at 860 and 866. Raised area B' likewise demonstrates about 3 mm pile height 858 shown as view 890. The remainder of carpet 850, shown in view 890 at 852, 854 and 856, and view 880 at 862 and 864, demonstrates approximately 0 mm pile height, through which the weft and warp are exposed. The transition zones are also mirror images. Transition zones 898a, 898b, 898c, 898d, 898e and 898f of upper carpet 850 are mirror images of transition zones 897a, 897b, 897c, 897d, 897e and 897f, of lower carpet 800, respectively.

Figure 9:
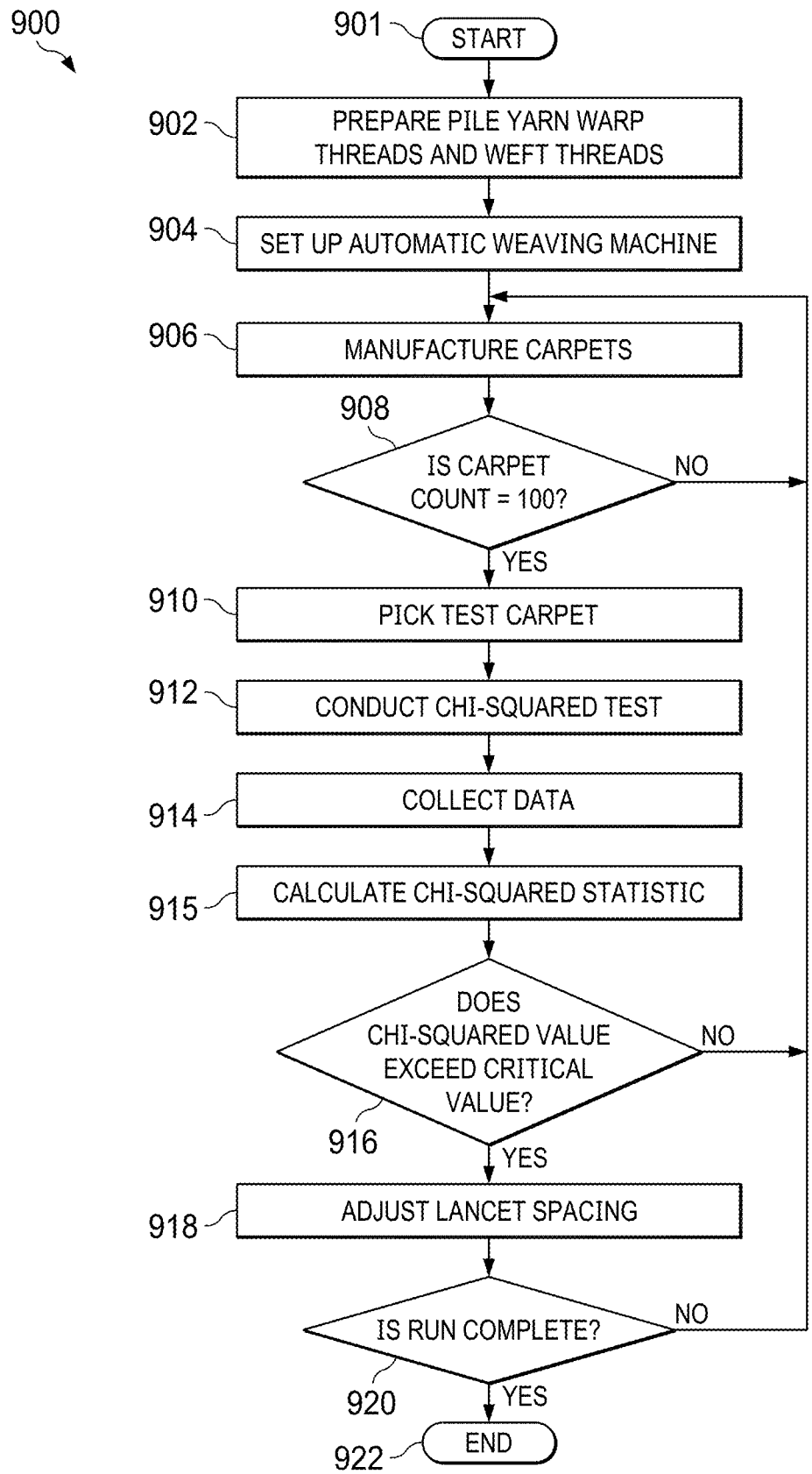
FIG. 9 is a flowchart of a preferred method of manufacture.

Referring to FIG. 9, method 900 of statistical quality control of manufacturing a pair of carpets according to the invention with the chi-squared test, will be further described.

At step 901, the method begins.

At step 902, the pile yarn, warp threads and weft threads are prepared, as previously described.

At step 904, the automated weaving machine lancets and tensions are set, as previously described.

At step 906, manufacturing of the carpets takes place, as previously described.

At step 908, a count of the number of finished carpets is made. If the finished carpet count meets or exceeds 100, then the process moves to step 910. If not, the method returns to step 906. Other finished carpet counts may be used.

At step 910, a test carpet is chosen from the finished carpets.

At step 912, a chi-squared test is conducted.

The chi-squared test is a statistical method that can be applied to evaluate the distribution of worn and raised areas in the carpet to determine whether it mimics the randomness found in genuine antique carpets. The test utilizes the chi-squared probability density function, which is based on the gamma function, the chi-squared value and the degrees of freedom of the system. In practice, a solution may be numerically calculated, or simply obtained from a chi-squared table based on the "degrees of freedom" and a "significance level". In this case, the primary goal of this test is to assess whether the observed distribution of these areas deviates significantly from the expected random pattern.

In a preferred embodiment, the chi-squared test reveals the proper distribution of "worn" areas to "unworn" areas in each carpet produced and is used to adjust the process so that acceptable carpets are provided. In this case, the chi-squared test, should reveal a P-value relatively low, typically P less than 0.05, suggesting that the worn areas are not uniformly distributed. The "P" value is the probability that the observed data could have occurred by random chance, and quantifies how well the observed data fits the manufacturing (or expected) criteria.

A null hypothesis of the chi-squared test is defined as the assumption that the worn and raised areas are distributed according to the expected random pattern. The alternative hypothesis posits that the distribution deviates significantly from this expected randomness. By testing these hypotheses, it can be determined whether or not the distribution of worn to unworn areas meets the desired aesthetic criteria. A standard chi-squared distribution is also assumed.

At step 914, data from the test carpet is collected by dividing the carpet into a grid of equally sized sections. For each section, the number of worn and raised areas is counted. Based on the expected percentage of worn areas which should range between 20% and 60% of the total, the expected number of worn and raised sections can be calculated.

At step 915, the chi-squared statistic is calculated. Using the observed and expected frequencies, the chi-squared statistic value is calculated with the formula:

$$\chi^2 = \sum \frac{(O_i - E_i)^2}{E_i}$$

Where:
$O_i$=observed frequency in each section; and
$E_i$=expected frequency in each section.

At step 916, the calculated chi-squared statistic value is compared to a critical value from the chi-squared distribution table. The degrees of freedom for the test are determined by subtracting one from the number of sections in the grid. By selecting a significance level, such as 0.05, one can identify the critical value to use for comparison. The significance level defines the level of risk of incorrectly rejecting the null hypothesis (also known as "Type 1 Error").

If the calculated chi-squared value exceeds the critical value, the null hypothesis is rejected, indicating that the distribution of worn and raised areas is non-random, and the process moves to step 918. Conversely, if the chi-squared value does not exceed the critical value, the distribution is considered consistent with the expected random pattern, and the process returns to step 906.

The critical value is derived from a chi-squared distribution table as known in the art. It plays a pivotal role in determining whether the observed distribution of worn and raised areas in a carpet aligns with the randomness expected in genuine antique carpets. This value acts as a benchmark for evaluating the null hypothesis, which assumes that the wear patterns are distributed randomly across the carpet.

To calculate the critical value, two key factors must be considered: the degrees of freedom "df" and the significance level "$\alpha$". The degrees of freedom depend on the number of sections into which the carpet is divided. By subtracting one from the total number of sections, the constraint that the sum of the observed and expected frequencies must be equal is accounted for. Preferably, each carpet is divided into between 10 and 100 equally sized sections. Other numbers of equally sized sections may be used.

The significance level establishes the threshold for determining whether deviations from the expected pattern are due to chance. It reflects the probability of rejecting the null hypothesis when it is actually true, indicating a confidence interval in the results.

Using the degrees of freedom and the chosen significance level, the critical value is preferably obtained from the chi-squared distribution table. The critical value serves as the cutoff point for the test. If the calculated chi-squared statistic from the observed data exceeds the critical value, the null hypothesis is rejected. This outcome indicates that the distribution of worn and raised areas significantly deviates from randomness, indicating that adjustments in the manufacturing process are necessary to achieve the desired aesthetic.

Hence, the critical value provides a quantitative standard for verifying that the carpet's wear patterns authentically replicate the randomness seen in antique carpets.

As an example, a test carpet is divided into a grid of 10 equally sized sections. Assume that the worn areas should make up between 20% and 60% of the total carpet area. For simplicity, assume that the expected percentage is 40%, meaning 4 out of 10 sections are expected to be worn, and the remaining 6 sections should be unworn.

After manufacturing the test carpet, distribution of worn and unworn areas is examined. The following number of worn sections in each of the ten sections is observed:

TABLE 16

| Observed Worn Areas | 2, 1, 5, 4, 3, 4, 5, 2, 4, 3 |
|---|---|
| Expected Worn Areas | 4 for each section (based on 40% of 10 sections) |

The chi-squared test evaluates the differences between observed and expected values.

Calculating for each section using the formula above.

$$\chi^2 = \frac{(2-4)^2}{4} + \frac{(1-4)^2}{4} + \frac{(5-4)^2}{4} + \frac{(4-4)^2}{4} + \frac{(3-4)^2}{4} + \frac{(4-4)^2}{4} +$$
$$\frac{(5-4)^2}{4} + \frac{(2-4)^2}{4} + \frac{(4-4)^2}{4} + \frac{(3-4)^2}{4}$$

Simplifying:

$$x2 = \frac{4}{4} + \frac{9}{4} + \frac{1}{4} + \frac{0}{4} + \frac{1}{4} + \frac{0}{4} + \frac{1}{4} + \frac{4}{4} + \frac{0}{4} + \frac{1}{4}$$

$$x^2 = 1 + 2.25 + 0.25 + 0 + 0.25 + 0 + 0.25 + 1 + 0 + 0.25 = 5.25$$

The degrees of freedom are calculated as df=10−1=9. For a significance level of $\alpha$=0.05, the critical value from a chi-squared distribution table is approximately 16.92.

Since the calculated chi-squared value (5.25) is less than the critical value (16.92) the null hypothesis is not rejected. This indicates that the observed distribution of worn and raised areas is consistent with the expected random pattern.

In this example, the chi-squared test confirms that the wear patterns in this test carpet are sufficiently random, meeting the aesthetic standard for replicating antique carpets. If the chi-squared value had exceeded the critical value, it would have suggested a significant deviation, prompting a change in the manufacturing process to achieve the desired randomness.

At step 918, changes to the manufacturing process are made to correct the distribution of worn areas to unworn areas. Preferably, the overlap distance "d" between the lancet tip and the edges of the cutting tables is changed, thereby changing the randomness of the worn areas. To decrease the randomness of the worn areas, the overlap distance "d" is increased. To increase the randomness of the worn areas, the overlap distance "d" is decreased. In practice, the distance "d" is decreased or increased by about 20% increments before rerunning the next batch of carpets, and the process is repeated until the test carpets meet the proper criteria.

At step 920, a determination as to whether or not the manufacturing run is completed. If so, the process moves to step 922. If not, the process returns to step 906.

At step 922, the process concludes.

The invention claimed is:

1. A system for manufacturing carpets having an antique appearance, with an automated weaving machine configured to produce a pair of carpets simultaneously, comprising:
    a warp beam stand producing a controlled tension, on a set of warp threads of the pair of carpets, operatively connected to the automated weaving machine;
    a reed assembly, for packing of a set of weft threads against a pile yarn of the pair of carpets;
    a first cutting table and a second cutting table adjacent the reed assembly;
    a moving knife, adjacent the first cutting table and the second cutting table;
    a set of draw-down lancets, positioned in the reed assembly with a first clearance above the first cutting table and a second clearance below the second cutting table; and
    a set of pile yarn having a composition that exhibits a controlled variation in a breaking load parameter, a tenacity parameter, and an elongation parameter and having a multi-color yarn cross-section.

2. The system of claim 1, wherein the set of pile yarn further comprises about 90% of a mixed synthetic fiber and about 10% of a natural wool fiber.

3. The system of claim 2, wherein the mixed synthetic fiber further comprises about 90% polypropylene and about 10% ethylene terephthalate.

4. The system of claim 1, wherein a draw-down lancet of the set of draw-down lancets has a lower flat surface opposite an upper tiered surface.

5. The system of claim 4, wherein the upper tiered surface further comprises:
    a set of flat tiers separated by a set of inclined portions and a lancet tip positioned adjacent the first cutting table and the second cutting table.

6. The system of claim 5, wherein the lancet tip has a height of about 3 mm.

7. The system of claim 1, wherein the multi-color yarn cross-section further comprises a darker core and a lighter exterior.

8. The system of claim 7, wherein the multi-color yarn cross-section is dyed with one of a group of cochineal, indigo and turmeric, in a two-step dyeing process.

9. The system of claim 1, wherein the set of warp threads further comprises:
    a set of slack threads with a denier of about 800 to about 1500 and a set of tight threads with a denier of about 1000 to about 2000.

10. The system of claim 1, wherein the reed assembly has a density of about 320 dents per meter.

11. The system of claim 1, wherein a first carpet of the pair of carpets is a mirror image of a second carpet of the pair of carpets.

12. The system of claim 11, wherein the first carpet has a worn area and an unworn area separated by a transition zone.

13. The system of claim 12, wherein the worn area has about a first pile height of about 0 mm and the unworn area has a second pile height of about 3 mm.

14. The system of claim 13, wherein the transition zone has a width of between about 3 cm and about 5 cm.

15. The system of claim 11, wherein the first carpet has a plurality of worn areas and a plurality of unworn areas.

16. The system of claim 15, wherein a total area of the plurality of worn areas is between about 20% and about 60% of a total carpet area of the first carpet of the pair of carpets.

17. The system of claim 1, wherein the first clearance is between about 6 mm and about 8 mm and the second clearance is between about 6 mm and about 8 mm.

18. The system of claim 1, wherein the automated weaving machine operates with a pick density of about 40 weft threads per centimeter.

19. The system of claim 1, wherein the set of pile yarn is crimped.

20. The system of claim 1, wherein the automated weaving machine has a beam width of about 4 meters.

21. The system of claim 1, wherein each carpet of the pair of carpets meets a chi-squared test wherein a P-value is less than 0.5, and a significance level is 0.5.

22. The system of claim 1, wherein the set of warp threads is under a tension of between about 2 kg and about 5 kg.

23. The system of claim 1, wherein the pile yarn is under a tension of between about 1.5 kg and about 3 kg.

24. The system of claim 1, wherein the breaking load parameter has a coefficient of variation of about 6.8%.

25. The system of claim 1, wherein the tenacity parameter has a coefficient of variation of about 6.6%.

26. The system of claim 1, wherein the elongation parameter has a coefficient of variation of about 5.8%.

27. A method for manufacturing carpets having an antique appearance, with an automated weaving machine, configured to produce a pair of carpets simultaneously, comprising the steps of:
    providing a warp beam stand, producing a controlled tension on a set of warp threads of the pair of carpets, operatively connected to the automated weaving machine;
    providing a reed assembly, for packing a set of weft threads against a pile yarn of the pair of carpets;
    providing a first cutting table and a second cutting table adjacent to the reed assembly;
    providing a moving knife adjacent the first cutting table and the second cutting table;
    providing a set of one-sided draw-down lancets, positioned in the reed assembly with a first clearance above the first cutting table, and a second clearance below the second cutting table; and
    providing a set of pile yarn with a composition that exhibits a controlled variation in a breaking load parameter, a tenacity parameter and an elongation parameter and having a multi-color yarn cross-section.

28. The method of claim 27, wherein the step of providing the set of pile yarn further comprises:
    preparing a mixture of polypropylene pellets and polyethylene terephthalate pellets;
    extruding the mixture into synthetic fibers with a denier between about 8 and about 9;
    crimping the synthetic fibers to resemble wool fibers;
    cutting the synthetic fibers to an average length of about 120 mm;
    blending the synthetic fibers with a set of wool fibers to produce a set of raw fiber locks;

opening, cleaning and carding the set of raw fiber locks to create a set of carded fibers;

drawing the set of carded fibers to a diameter of between about 0.3 dtex and 1.0 dtex to create a set of drawn fibers;

spinning the set of drawn fibers to produce a twist of about 5.5 to 6.5 reps per inch in a Z-direction in the set of pile yarn;

dying the set of pile yarn using a two stage dyeing process to create a multicolored effect across a cross-section of the set of pile yarn; and finishing the set of pile yarn by washing, softening and drying at a temperature of about 90° C.

29. The method of claim 28, wherein in the mixture comprises about 90% polypropylene pellets and about 10% polyethylene terephthalate pellets.

30. The method of claim 28, wherein the step of crimping the synthetic fibers is performed using a mechanical crimping tool with a series of rollers.

31. The method of claim 28, wherein the set of wool fibers includes New Zealand wool fibers with an average diameter of about 37 μm.

32. The method of claim 28, wherein the step of blending the synthetic fibers produces a fiber composition of about 90% synthetic fibers and about 10% wool fibers.

33. The method of claim 28, wherein the step of spinning the set of drawn fibers produces yarn with a denier of about 1.125/1.

34. The method of claim 28, wherein the two stage dyeing process further comprises:

using a stage 1 dye bath containing a first set of selected dyes; and using a stage 2 dye bath containing a second set of selected dyes;

wherein the second set of selected dyes has a differing set of concentration from the first set of selected dyes.

35. The method of claim 34, wherein the stage 1 dye bath is maintained at about 98° C. for about 20 to 40 minutes.

36. The method of claim 34, wherein the set of pile yarn is dyed in the stage 2 dye bath for an additional 20 to 40 minutes at about 98° C.

37. The method of claim 34, wherein the stage 1 dye bath and the stage 2 dye bath are combinations of natural and synthetic dye elements.

38. The method of claim 28, when the step of finishing includes adjusting a pH of a washing bath to between about 5 and 6 using acetic acid.

39. The method of claim 34, wherein the first set of selected dyes is more concentrated than the second set of selected dyes.

40. The method of claim 28, wherein the step of drying is performed at about 90° C. for about one hour to set a permanent twist in the set of pile yarn.

41. The method of claim 28, wherein the set of pile yarn produced has a breaking load of about 4.2 kgf with a coefficient of variation of about 6.8%.

42. The method of claim 28, wherein the set of pile yarn has a tenacity of about 10.5 grams/tex with a coefficient of variation of about 6.6%.

43. The method of claim 28, the multicolored effect further comprises:

a lighter outer diameter and a darker inner diameter.

44. The method of claim 28, wherein the elongation parameter is about 22.25% with a coefficient of variation of about 5.8%.

45. The method of claim 28, wherein the set of pile yarn is capable of achieving a pile height ranging from about 0 mm to about 5 mm when woven into one carpet of the pair of carpets.

46. The method of claim 27, wherein the set of pile yarn exhibits sufficient variability in a set of properties to produce the pair of carpets with a randomized wear pattern that mimics an appearance of antique carpets.

* * * * *